(12) United States Patent
Fujisawa

(10) Patent No.: US 11,567,458 B2
(45) Date of Patent: Jan. 31, 2023

(54) ELECTRONIC WATCH AND METHOD OF CORRECTING TIME DIFFERENCE

(71) Applicant: Seiko Epson Corporation, Tokyo (JP)

(72) Inventor: Teruhiko Fujisawa, Shiojiri (JP)

(73) Assignee: SEIKO EPSON CORPORATION

( * ) Notice: Subject to any disclaimer, the term of this patent is extended or adjusted under 35 U.S.C. 154(b) by 481 days.

(21) Appl. No.: 16/724,633

(22) Filed: Dec. 23, 2019

(65) Prior Publication Data
US 2020/0201264 A1 Jun. 25, 2020

(30) Foreign Application Priority Data
Dec. 25, 2018 (JP) .............................. JP2018-240835

(51) Int. Cl.
| | | |
|---|---|---|
| G04R 40/02 | (2013.01) | |
| H04W 84/12 | (2009.01) | |
| H04W 74/06 | (2009.01) | |
| G04R 20/04 | (2013.01) | |
| G01S 19/14 | (2010.01) | |

(52) U.S. Cl.
CPC .............. *G04R 20/04* (2013.01); *G01S 19/14* (2013.01); *H04W 74/06* (2013.01); *H04W 84/12* (2013.01); *G04R 40/02* (2013.01)

(58) Field of Classification Search
CPC ............................. H04W 84/12; H04W 74/06
See application file for complete search history.

(56) References Cited

U.S. PATENT DOCUMENTS

| | | | |
|---|---|---|---|
| 6,282,431 B1* | 8/2001 | Konno | H04M 1/72451 455/425 |
| 8,059,491 B1* | 11/2011 | Hennings-Kampa | G04G 9/0064 368/282 |
| 2009/0180356 A1 | 7/2009 | Fujisawa | |
| 2017/0212476 A1* | 7/2017 | Iijima | G04R 20/02 |

FOREIGN PATENT DOCUMENTS

| | | |
|---|---|---|
| JP | H11-136755 A | 5/1999 |
| JP | 2009-168620 A | 7/2009 |
| JP | 2015-143630 A | 8/2015 |
| JP | 2019-124641 A | 7/2019 |

* cited by examiner

*Primary Examiner* — Angel T Brockman
(74) *Attorney, Agent, or Firm* — Harness, Dickey & Pierce, P.L.C.

(57) ABSTRACT

An electronic watch includes a GPS receiver, a first time correction unit configured to correct time using the time information received by the GPS receiver, a beacon receiver configured to receive a beacon signal containing beacon identification information transmitted from a beacon installed indoors, a first storage unit configured to store beacon identification information and time difference information corresponding to the beacon identification information, a second time correction unit configured to correct a time difference using the beacon signal received by the beacon receiver and the time difference information stored in the first storage unit, and a button configured to accept a reception instruction of the beacon signal, which is operated by an operator. The beacon receiver is configured to receive a beacon signal when the button accepts the reception instruction.

7 Claims, 22 Drawing Sheets

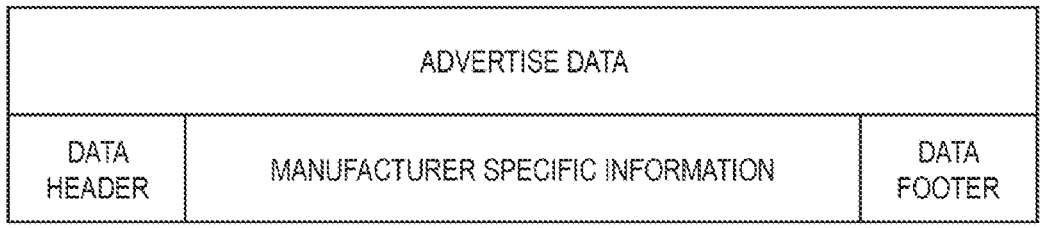
FIG. 14
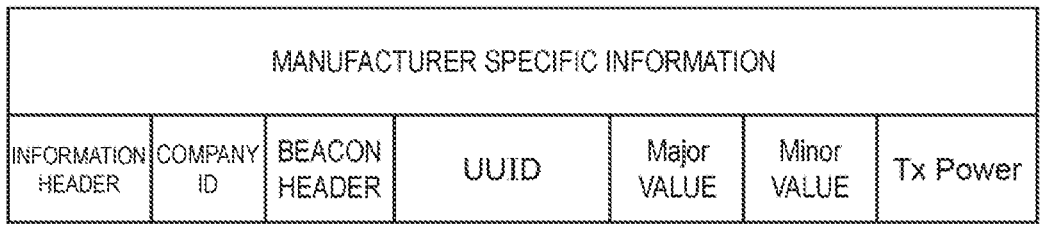
FIG. 15
| | BLCOK NUMBER | LATITUDE INFORMATION | LONGITUDE INFORMATION | TIME DIFFERENE INFORMATION |
|---|---|---|---|---|
| GPS LOCATION INFORMATION TIME ZONE DATA | 1 | LAT. 36°10'32" N. | LONG. 138°48'39" E. | +9.0 |
| | 2 | LAT. 40°41'9" N. | LONG. 74°5'3" W. | -5.0 |
| | ... | ... | ... | ... |
| | 1000000 | LAT. 48°51'59" N. | LONG. 2°22'58" E. | 0.0 |
| | BEACON NUMBER | UUID | | TIME DIFFERENE INFORMATION |
| BEACON INFORMATION TIME ZONE DATA | 1 | si4g5h62rt95 | | +3.0 |
| | 2 | s8tg459kg81r | | -6.0 |
| | ... | ... | | ... |
| | 30000 | jf68d1f2n6b3 | | -8.0 |
FIG. 16

ELECTRONIC WATCH AND METHOD OF CORRECTING TIME DIFFERENCE

The present application is based on, and claims priority from, JP Application Serial Number 2018-240835, filed Dec. 25, 2018, the disclosure of which is hereby incorporated by reference herein in its entirety.

BACKGROUND

1. Technical Field

The present disclosure relates to an electronic watch and a method of correcting a time difference.

2. Related Art

JP-A-2009-168620 discloses an electronic watch that performs correction of time by receiving a satellite signal from an artificial satellite of a Global Positioning System (GPS). The satellite signal from an artificial satellite of GPS is also referred to as a GPS artificial satellite. According to the disclosure, the electronic watch is provided with simple time correction by which time is corrected using a satellite signal received from one artificial satellite. Further, the electronic watch is provided with time correction by which time is corrected using satellite signals received from three artificial satellites. When the satellite signals can be received, the electronic watch can correct time at high accuracy.

JP-A-11-136755 discloses a mobile phone terminal device that corrects time by receiving a radio wave containing notification information transmitted from a base station. According to the disclosure, the notification information contains identification information with which a base station that transmits the notification information is identified. Further, the mobile phone terminal device stores a time difference table. The time difference table contains time difference information corresponding to the base station. Further, the mobile phone terminal device can perform time correction using the notification information and the time difference table.

The electronic watch disclosed in JP-A-2009-168620 can perform time correction at high accuracy when a satellite signal can be received. However, the electronic watch cannot receive a satellite signal indoors, such as an airport, which is formed of a material such as reinforced concrete through which a radio wave is less likely to pass. Thus, it is difficult to perform time correction indoors through which a radio wave is less likely to pass. The number of buildings, such as an airport, in which a beacon is installed inside is increasing. The beacon transmits a radio wave containing beacon identification information. When the electronic watch stores correction information corresponding to the beacon identification information, the electronic watch can perform time correction by receiving a radio wave transmitted from the beacon. However, the number of beacons installed all over the world is enormous. Thus, it is difficult for a storage device included in the electronic watch to store all the correction information corresponding to identification information of the beacons. In view of this, an electronic watch that can correct time at high accuracy with a limited storage capacity has been desired.

SUMMARY

An electronic watch according to the present application includes a first receiver configured to receive a satellite signal, a first time correction unit configured to correct the time using time information contained in the satellite signal received by the first receiver, a second receiver configured to receive a beacon signal containing beacon identification information transmitted from a radio station installed indoors, a storage unit configured to store predetermined beacon identification information and time difference information corresponding to the beacon identification information, a second time correction unit configured to correct a time difference using the beacon signal received by the second receiver and the time difference information stored in the storage unit, and an operation device configured to accept a reception instruction of the beacon signal. The second receiver configured to receive the beacon signal when the operation device accepts the reception instruction.

An electronic watch according to the present application includes a first receiver configured to receive a standard radio wave, a first time correction unit configured to correct the time using time information contained in the standard radio wave received by the first receiver, a second receiver configured to receive a beacon signal containing beacon identification information transmitted from a radio station installed indoors, a storage unit configured to store predetermined beacon identification information and time difference information corresponding to the beacon identification information, a second time correction unit configured to correct a time difference using the beacon signal received by the second receiver and the time difference information stored in the storage unit, and an operation device configured to accept a reception instruction of the beacon signal. The second receiver configured to receive the beacon signal when the operation device accepts the reception instruction.

In the electronic watch described above, the first receiver may be configured to receive a plurality of satellite signals each of which contains satellite orbit information, the first time correction unit may include a location calculation unit configured to calculate a reception location from a plurality of pieces of satellite orbit information. When the first receiver fails to receive the plurality of satellite signals, the first receiver may stop, and the second receiver may receive the beacon signal.

In the electronic watch described above, the first receiver may be configured to receive a plurality of satellite signals each of which contains satellite orbit information, the first time correction unit may include a location calculation unit configured to calculate a reception location from a plurality of pieces of satellite orbit information, and the first receiver and the second receiver may be operated in parallel.

In the electronic watch described above, the storage unit may include a re-writable nonvolatile memory.

A method of correcting a time difference according to the present application, which is performed by an electronic watch including a storage unit configured to store beacon identification information and time difference information corresponding to the beacon identification information, and an operation device, includes receiving a satellite signal containing time information, correcting time using the time information when the satellite signal is received, receiving a beacon signal when the operation device accepts a reception instruction of the beacon signal containing beacon identification information, and correcting a time difference using the time difference information stored in the storage unit based on the beacon identification information contained in the beacon signal when the beacon signal is received.

A method of correcting a time difference according to the present application, which is performed by an electronic watch including a storage unit configured to store beacon identification information and time difference information corresponding to the beacon identification information, and an operation device, includes receiving a standard radio wave containing time information, correcting time using the time information when the standard radio wave is received, receiving a beacon signal when the operation device accepts a reception instruction of the beacon signal containing beacon identification information, and correcting a time difference using the time difference information stored in the storage unit based on the beacon identification information contained in the beacon signal when the beacon signal is received.

BRIEF DESCRIPTION OF THE DRAWINGS

FIG. 14 is a view illustrating a configuration of an advertise packet.

FIG. 15 is a view illustrating a configuration of an advertise packet.

FIG. 16 is a view illustrating time zone data.

DESCRIPTION OF EXEMPLARY EMBODIMENTS

Figure 1:
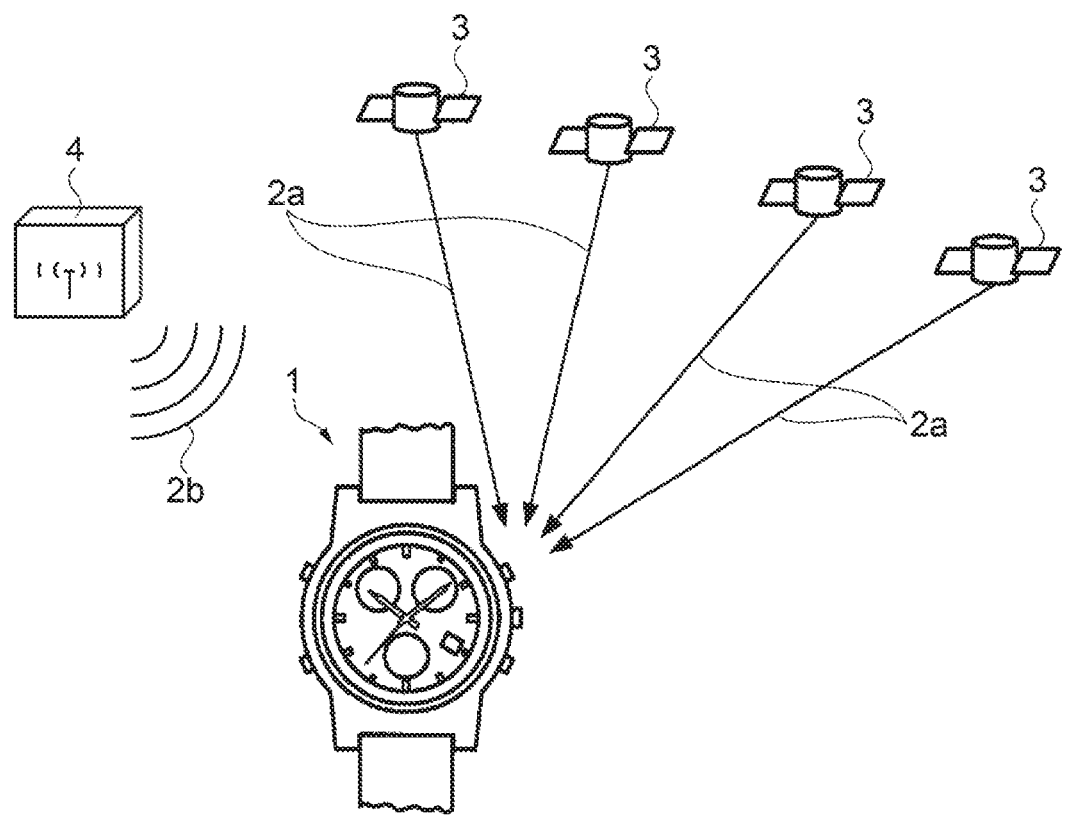
FIG. 1 is a schematic view illustrating a use environment for an electronic watch according to a first exemplary embodiment.

Now, exemplary embodiments are described with reference to the drawings. Note that the scales of the members illustrated in the drawings are changed to be recognizable for illustration in each drawing.

First Exemplary Embodiment

In the present exemplary embodiment, with reference to the drawings, characteristic examples of an electronic watch and a method of correcting time and a time difference with which the electronic watch corrects time are described. With reference to FIG. 1 to FIG. 16, an electronic watch according to a first exemplary embodiment is described. Each of FIG. 1 and FIG. 2 is a schematic view illustrating a use environment for the electronic watch.

As illustrated in FIG. 1, a plurality of artificial satellites 3, which transmit first radio waves 2a to an electronic watch 1, orbit in predetermined orbits above the earth. The artificial satellites 3 are GPS satellites. The first radio waves 2a transmitted from the artificial satellites 3 are referred to as satellite signals. The electronic watch 1 has a function of receiving the satellite signals from the plurality of artificial satellites 3.

Beacons 4 being radio stations that transmit second radio waves 2b to the electronic watch 1 are installed in a building such as an airport. The second radio waves 2b transmitted from the beacons 4 are referred to as beacon signals. The electronic watch 1 has a function of performing communication with the beacons 4 by Bluetooth (registered trademark) Low Energy (BLE) being one kind of near field communication. The BLE is a communication mode of Bluetooth that enables communication with low power consumption. The communication in the BLE communication mode is referred to as BLE communication.

Figure 2:
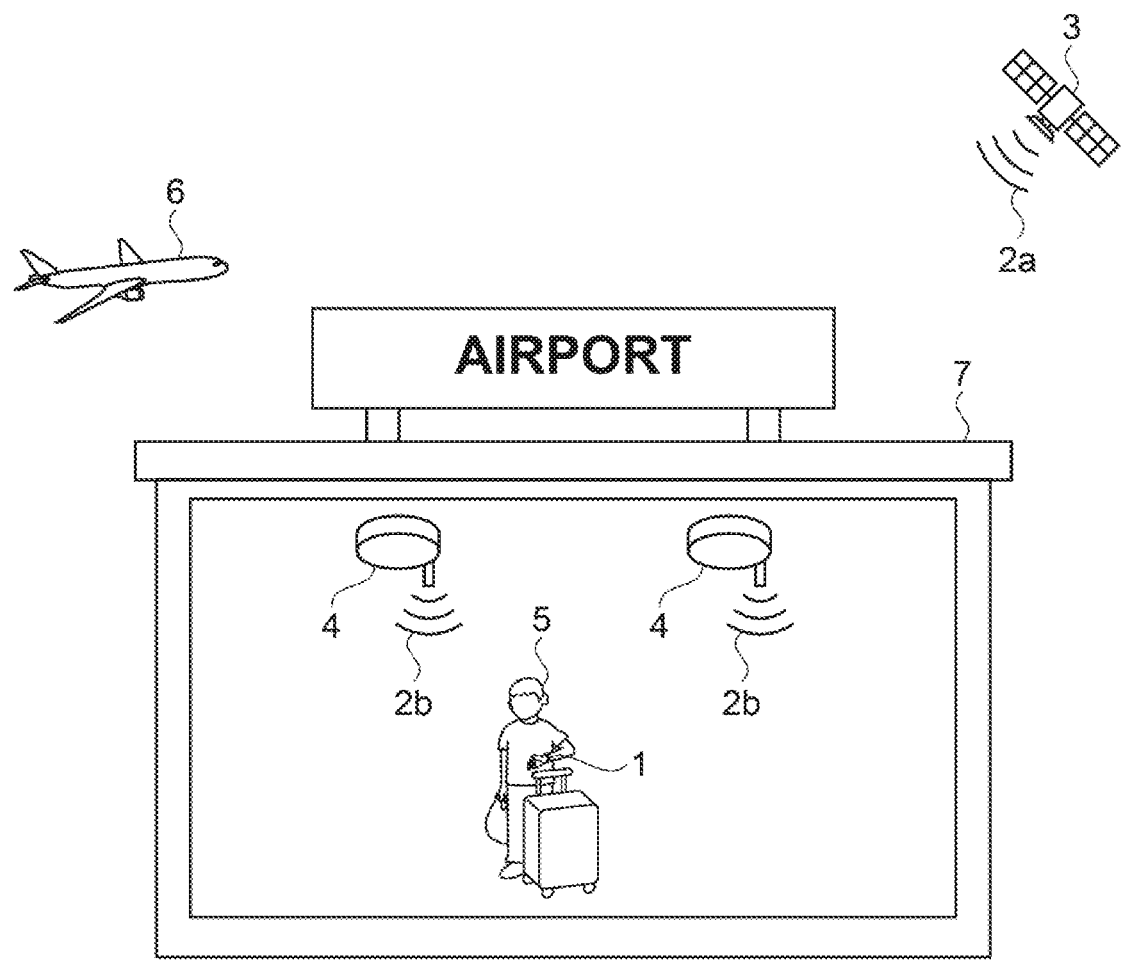
FIG. 2 is a schematic view illustrating a use environment for the electronic watch.

As illustrated in FIG. 2, an operator 5 wears the electronic watch 1 around a wrist. The electronic watch 1 is a wrist watch. Further, it is assumed that the operator 5 traveled on a plane 6, and arrived at an airport 7. Walls of the airport 7 are made of reinforced concrete, and hence a radio wave is less liable to pass through. Therefore, the electronic watch 1 cannot receive the first radio wave 2a transmitted from the artificial satellite 3. The beacons 4 are installed inside the airport 7. The beacons 4 are arranged at an interval of, for example, 40 m. The electronic watch 1 receives the second radio wave 2b transmitted from the beacon 4. The electronic watch 1 cam receive the second radio wave 2b at a location within 30 m from the beacon 4. Further, the electronic watch 1 has a function of performing time correction by receiving a radio wave transmitted from the beacon 4.

Figure 3:
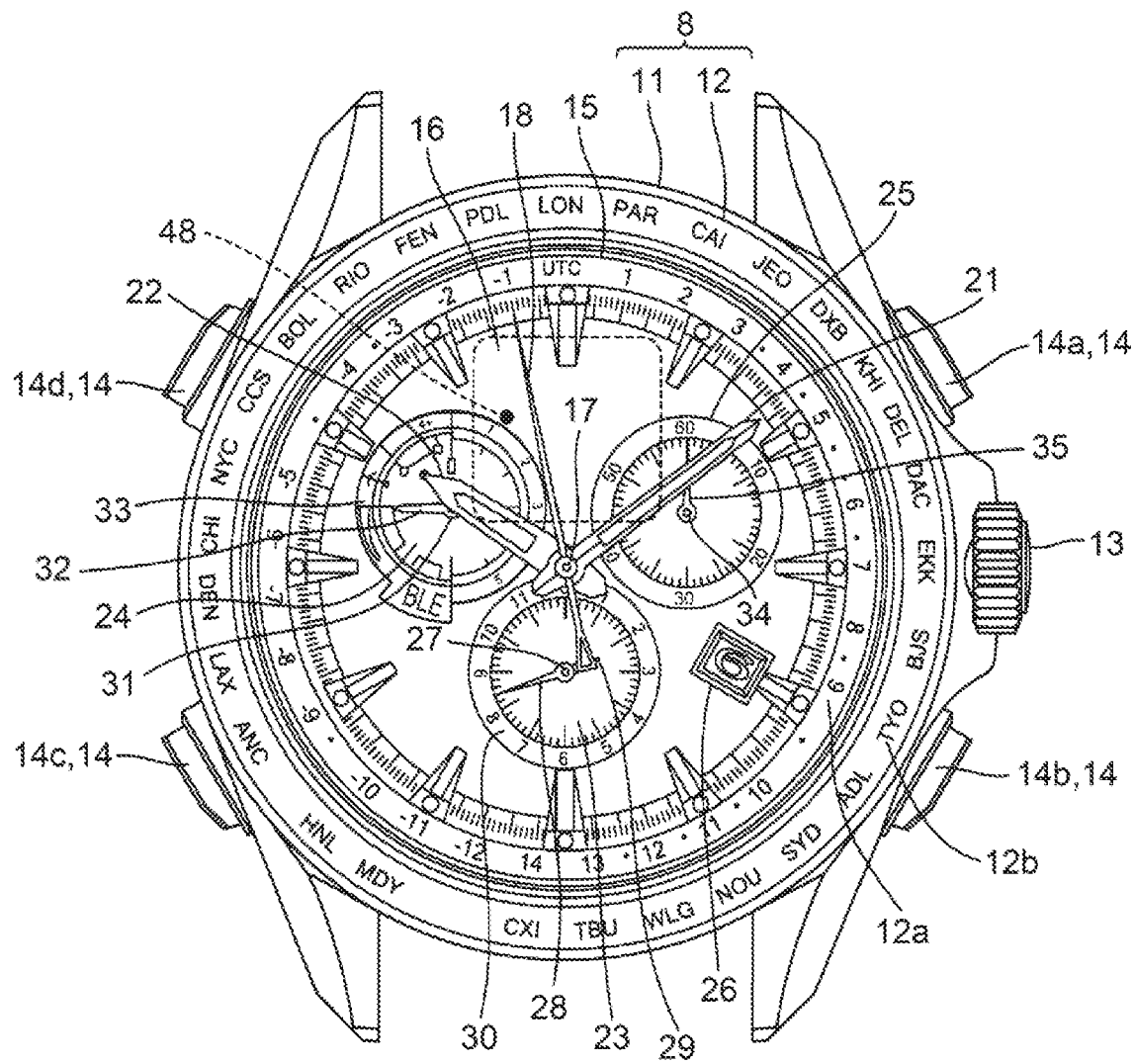
FIG. 3 is a schematic plan view illustrating a structure of the electronic watch.
Figure 4:
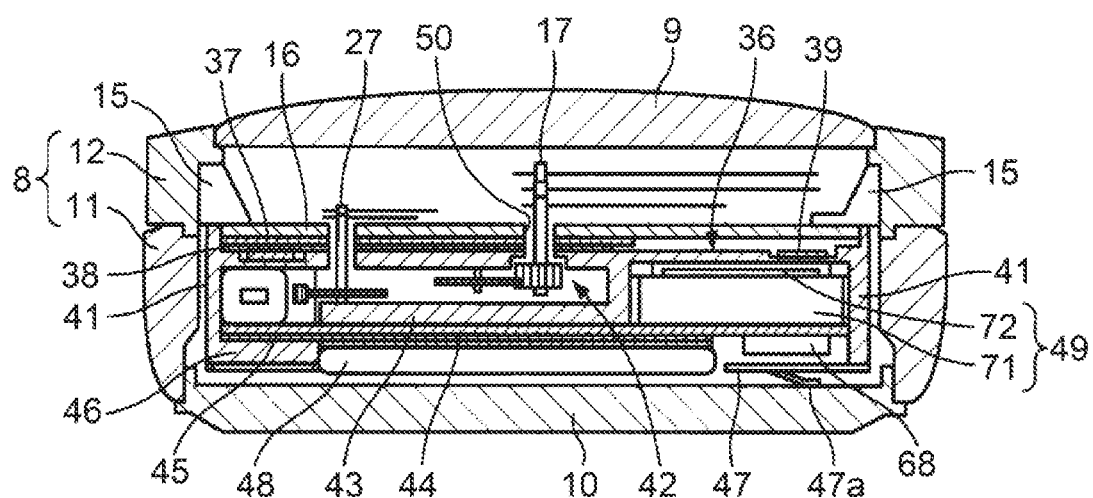
FIG. 4 is a schematic side cross-sectional view illustrating a configuration taken along a plane passing through a position at twelve o'clock and a position at six o'clock of the electronic watch.
Figure 5:
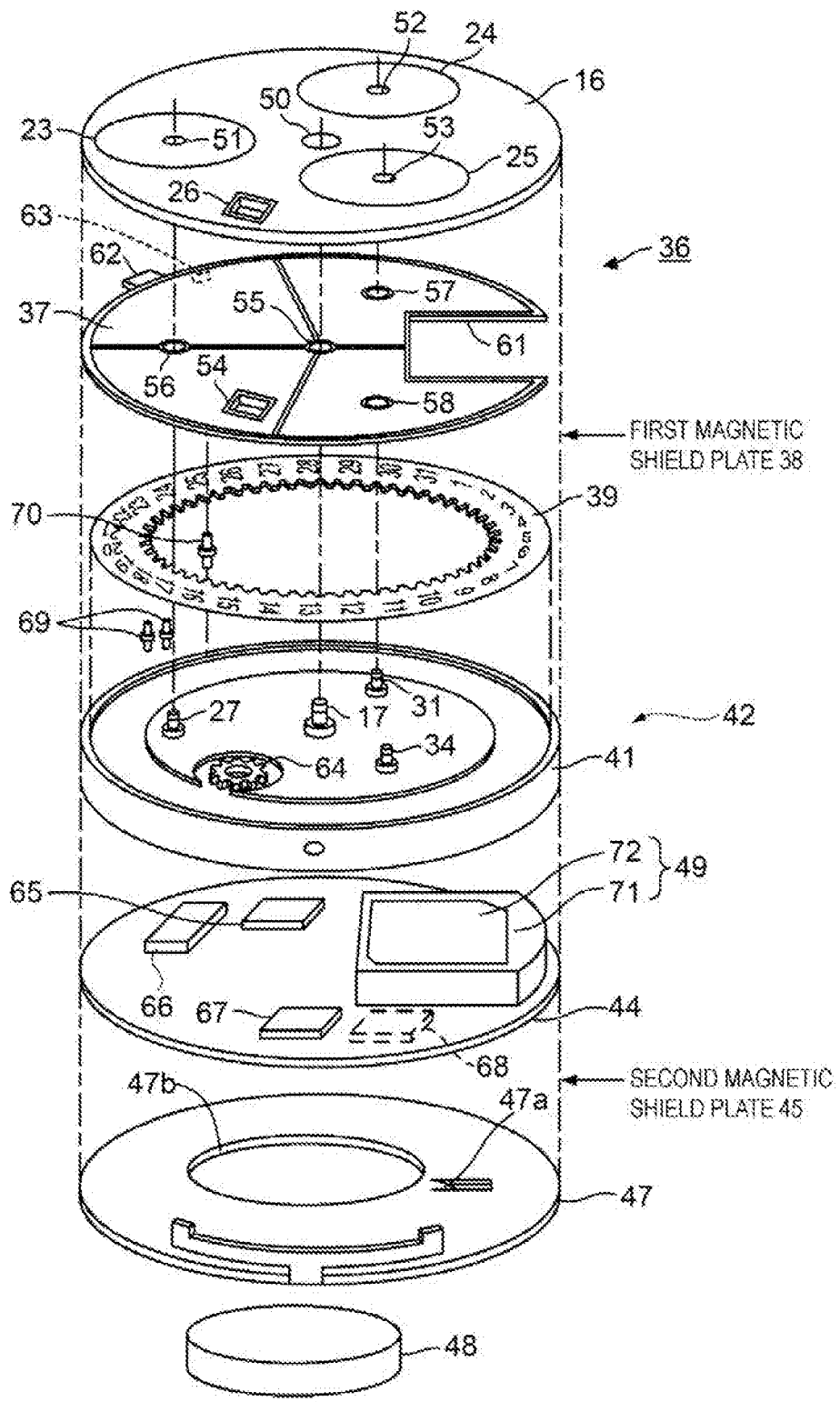
FIG. 5 is an exploded perspective view of a movement of the electronic watch.

FIG. 3 is a schematic plan view illustrating a structure of the electronic watch. FIG. 4 is a schematic side cross-sectional view illustrating a configuration taken along a plane passing through a position at twelve o'clock and a position at six o'clock of the electronic watch. FIG. 5 is an exploded perspective view of a movement of the electronic watch.

As illustrated in FIG. 3 and FIG. 4, the electronic watch 1 includes a cylindrical outer case 8. A cover glass 9 is arranged on one end of the outer case 8 along the cylindrical shaft, and a case back 10 is arranged on the other end. Description is made with the cover glass 9 side of the electronic watch 1 as a front surface side or an upper side and the case back 10 side as a back surface side or a lower side.

The outer case 8 has a structure in which a bezel 12 is fitted in a cylindrical conductive case 11. The case 11 has two openings. Of those two openings, one opening in the front surface side is closed with the cover glass 9 through intermediation of the bezel 12, and the other opening in the back surface side is closed with the case back 10. A crown 13 and four buttons 14 are provided on a side surface of the outer case 8. The buttons 14 include a first button 14a, a second button 14b, a third button 14c, and a fourth button 14d. The crown 13 and the four buttons 14 function as an operation device.

A metal material such as stainless steel, titanium alloy, aluminum, and brass is used for the case 11 and the case back 10. A ceramic material such as zirconia, titanium carbide, titanium nitride, and alumina is used for the bezel 12. A radio wave passes through a ceramic material, and hence the electronic watch 1 has satisfactory radio communication performance.

A circular and flat-plate shaped dial 16 is arranged on the inner circumferential side of the bezel 12 through intermediation of a dial ring 15 having a ring shape formed of plastic. Indicators for indicating time are arranged on the dial 16. The dial 16 is formed of a non-conductive and transmissive plastic material such as polycarbonate that allows at least part of light to pass therethrough.

A center pointer shaft 17 is at a plane center position of the dial 16, and a center second hand 18, a center minute hand 21, and a center hour hand 22 that indicate time are mounted to the center pointer shaft 17. Hereinafter, the second hand, the minute hand, and the hour hand are collectively referred to as pointers. The center pointer shaft 17 is constituted of three rotary shafts to which the center second hand 18, the center minute hand 21, and the center hour hand 22 are mounted.

Further, a first sub dial 23, as second sub dial 24, a third sub dial 25, and a calendar indicator 26 are arranged on the dial 16. The first sub dial 23 is provided at a position at six o'clock. The second sub dial 24 is provided at a position at ten o'clock. The third sub dial 25 is provided at a position at two o'clock. The calendar indicator 26 for causing a calendar to be visually recognized is provided at a position at four o'clock.

A first sub pointer shaft 27 is at a center position of the first sub dial 23. A first sub minute hand 28 and a first sub hour hand 29 being pointers for indicating dual time are mounted to the first sub pointer shaft 27. Further, a first annular portion 30 is arranged on the outer circumference of the first sub dial 23, and numerals indicating time are displayed on the first annular portion 30.

A second sub pointer shaft 31 is at a center position of the second sub dial 24. A second sub pointer 32 for indicating a mode and a battery residual amount is mounted to the second sub pointer shaft 31. A second annular portion 33 is arranged on the outer circumference of the second sub dial 24. A crescent indicator for indicating a battery residual amount is displayed from a position at nine o'clock to a position at eight o'clock in the left half in the second annular portion 33. The second sub pointer 32 indicate a battery residual amount.

A mark "1" for indicating that time measurement reception processing using a satellite signal is in progress and a mark "4+" for indicating that location measurement processing is in progress are displayed on the second annular portion 33. Further, the second sub pointer 32 indicates that the time measurement reception processing and the location measurement reception processing are in progress. Further, a mark "BLE" for indicating that the BLE communication is in progress is displayed on the second annular portion 33. The second sub pointer 32 indicates that the BLE communication is in progress.

In the time measurement reception processing, the first radio wave 2a is received from the artificial satellite 3, and time information is extracted from the first radio wave 2a. Execution of the time measurement reception processing is referred to as time measurement reception, measurement of time, or time measurement. In the location measurement reception processing, the first radio wave 2a is received from the artificial satellite 3, and a location of the electronic watch 1 is calculated based on the first radio wave 2a. The location measurement reception processing is referred to as location measurement reception, measurement of location, or location measurement. In the BLE communication, the second radio wave 2b is received from the beacon 4, and a location of the electronic watch 1 is calculated based on the second radio wave 2b. The BLE communication is also referred to as beacon ID reception.

A third pointer shaft 34 is at a plane center position of the third sub dial 25. A third sub pointer 35 for chronograph display is mounted to the third pointer shaft 34.

The dial ring 15, which is formed of a synthetic resin being a non-conductive member, such as Acrylonitrile, Butadiene, Styrene (ABS) resin, is provided on the front surface side of the dial 16. The dial ring 15 is arranged along the periphery of the dial 16, and has an inner circumferential surface formed as an inclination surface. When the dial ring 15 is formed of plastic, reception performance can be secured, and a complex shape can be formed to improve design.

The bezel 12 includes a first front surface region 12a and a second front surface region 12b in a concentric circular shape. The second front surface region 12b is arranged on the outer circumferential side of the first front surface region 12a. The alphabets "UTC" indicating coordinated universal time are displayed on the first front surface region 12a on the upper side in the drawing. Further, time difference information indicating a time difference from coordinated universal time is displayed with numerals. Further, city information indicating names of representative cities for time zones is displayed on the second front surface region 12b. The city information is displayed with a three-letter code being an abbreviation formed of three alphabets standing for a name of a city, such as "TYO" standing for Tokyo.

As illustrated in FIG. 4, a movement 36 is housed in a region on the back surface side of the dial 16. The movement 36 includes a solar cell panel 37, a first magnetic shield plate 38, a calendar wheel 39, a main plate 41, a drive mechanism 42, a train wheel bridge 43, a printed wired board 44, a second magnetic shield plate 45, a spacer 46, a circuit cover plate 47, and a secondary battery 48, which are sequentially arranged from the dial 16 to the case back 10.

A planar antenna 49 for receiving the first radio wave 2a transmitted from the artificial satellite 3 is arranged on the printed wired board 44. The planar antenna 49 is also referred to as a patch antenna. Further, the solar cell panel includes a back surface protection material (not shown). Moreover, the back surface protection material functions as a near field communication antenna that receives the second radio wave 2b transmitted from the beacon 4. A frequency band of the second radio wave 2b is not particularly limited, and is 2.4 GHz band in the present exemplary embodiment.

Materials of the calendar wheel 39, the main plate 41, the train wheel bridge 43, and the spacer 46 are resin materials in order to prevent the planar antenna 49 and the antenna in near field communication from being affected.

Subsequently, with reference to FIG. 4 and FIG. 5, the elements forming the movement 36 are sequentially described in an order from a side of the dial 16 to the case back 10. Note that, for easy understanding of FIG. 5, only positions of the first magnetic shield plate 38 and the second magnetic shield plate 45 are indicated with arrows, and illustration thereof is omitted.

As illustrated in FIG. 4 and FIG. 5, a center through hole 50 is arranged in the center of the dial 16. The center pointer shaft 17 is inserted int the center through hole 50. A first sub through hole 51 is arranged in the center of the first sub dial 23. The first sub pointer shaft 27 is inserted into the first sub through hole 51. A second sub through hole 52 is arranged in the center of the second sub dial 24. The second sub pointer shaft 31 is inserted into the second sub through hole 52. A third sub through hole 53 is arranged in the center of the third sub dial 25. The third pointer shaft 34 is inserted into the third sub through hole 53. In addition to those, the calendar indicator 26 is arranged between the first sub dial 23 and the third sub dial 25.

The solar cell panel 37 is positioned on the back side of the dial 16. Further, the solar cell panel 37 receives light and generates power. An opening 54, which overlaps with the calendar indicator 26 of the dial 16 in plan view seen from the front side, is formed in the solar cell panel 37. In addition to this, a center through hole 55, a first trough-hole 56, a second through hole 57, and a third through hole 58 are formed in the solar cell panel 37. The center pointer shaft 17 is inserted through the center through hole 55, and the first sub pointer shaft 27 is inserted through the first through hole 56. The second sub pointer shaft 31 is inserted through the second through hole 57, the third pointer shaft 34 is inserted through the third through hole 58. Further, a first cutout portion 61, which overlaps with the planar antenna 49 in plan view seen from the front surface side, is formed in the solar cell panel 37.

The solar cell panel 37 is divided into a plurality of solar cells, and the cells are connected in series. The solar cells obtained by dividing the solar cell panel 37 have an equal light reception area. Further, the solar cell panel 37 outputs a voltage higher than a voltage generated by each of the solar cells.

A first electrode 62 is arranged and protrudes in the periphery of the solar cell panel 37. Further, a second electrode 63 is arranged near the first electrode 62. the first electrode 62 and the second electrode 63 is conducted to power terminals for a positive electrode and a negative electrode of the printed wired board 44 via wiring lines such as coil springs (not shown).

The first magnetic shield plate 38 prevents a malfunction of motors due to an external magnetic field. The first magnetic shield plate 38 is formed of a high permeability material such as pure iron. The first magnetic shield plate 38 is arranged at a position overlapping with motors of the drive mechanism 42 in plan view seen from the front surface side. The first magnetic shield plate 38 is a conductive plate, and hence interferes reception of a radio wave. Thus, in plan view seen from the front surface side, the first magnetic shield plate 38 has a plane shape that overlaps with the motors of the drive mechanism 42 and does not overlap with the planar antenna 49.

The calendar wheel 39 is arranged on the main plate 41. The calendar wheel 39 is formed in a ring shape and has a front surface on which a date is displayed. The calendar wheel 39 is formed of a non-conductive member such as plastic. In plan view seen from the front surface side, the calendar wheel 39 overlaps with a part of the planar antenna 49. However, the calendar wheel 39 is non-conductive, and hence the planar antenna 49 does not disadvantageously affects reception of a satellite signal.

One end of the center pointer shaft 17, one end of the first sub pointer shaft 27, one end of the second sub pointer shaft 31, and one end of the third pointer shaft 34 are pivotally supported on the main plate 41. The other end of the center pointer shaft 17, the other end of the first sub pointer shaft 27, the other end of the second sub pointer shaft 31, and the other end of the third pointer shaft 34 pass through the center through hole 55, the first through hole 56, the second through hole 57, and the third through hole 58, respectively, which are formed in the solar cell panel 37.

Moreover, the other end of the center pointer shaft 17, the other end of the first sub pointer shaft 27, the other end of the second sub pointer shaft 31, and the other end of the third pointer shaft 34 pass through the center through hole 50, the first sub through hole 51, the second sub through hole 52, and the third sub through hole 53, respectively, which are provided in the dial 16, and protrude to the cover glass 9 side. Further, the center second hand 18, the center minute hand 21, and the center hour hand 22 are mounted to the center pointer shaft 17 protruding from the dial 16. The first sub minute hand 28 and the first sub hour hand 29 are mounted to the first sub pointer shaft 27. The second sub pointer 32 is mounted to the second sub pointer shaft 31. The third sub pointer 35 is mounted to the third pointer shaft 34.

The drive mechanism 42 includes a plurality of stepping motors and a plurality of train wheels that drive the center second hand 18, the center minute hand 21, the center hour hand 22, the first sub minute hand 28, the first sub hour hand 29, the second sub pointer 32, the third sub pointer 35, and the calendar wheel 39, which are provided to the dial 16.

The stepping motors of the drive mechanism 42 are mounted on the main plate 41. Shafts of many of gears 64 of the train wheels are supported between the main plate 41 and the train wheel bridge 43. The gear 64 illustrated in FIG. 5 drives the calendar wheel 39. In plan view seen from the front surface side, the motors and the train wheels forming the drive mechanism 42 are provided in a region that does not overlap with the planar antenna 49.

A beacon communication circuit 65, a control display module 66, a power source control circuit 67, and the planar antenna 49 are arranged on the front surface side of the printed wired board 44. Further, a GPS communication circuit 68 is arranged the back surface side of the printed wired board 44.

A first conductive member 69 is arranged between the first electrode 62 and the second electrode 63 on the solar cell panel 37 and the printed wired board 44. Further, power generated by the solar cell panel 37 is transmitted to the printed wired board 44 via the first conductive member 69. Further, a second conductive member 70 is arranged between the back surface protection material provided on the solar cell panel 37 and the printed wired board 44. A radio wave received by the back surface protection material is transmitted to the beacon communication circuit 65 via the second conductive member 70.

The planar antenna 49 receives a satellite signal with a frequency of 1.575 GHz transmitted from the artificial satellite 3. The planar antenna 49 is a patch antenna formed by laminating a conductive antenna electrode 72 on a ceramic dielectric base material 71. the dielectric base material 71 is obtained by forming and firing barium titanate having a relative dielectric constant of, approximately from 80 to 200. The material of the conductive antenna electrode 72 is silver.

In the planar antenna 49 in the present exemplary embodiment, the dielectric base material 71 has a front surface in, for example, a substantially square shape, and a dimension of one side is approximately 11 mm. The antenna electrode 72 has a front surface in a substantially square shape, and a dimension of one side is approximately from 8 mm to 9 mm. The planar antenna 49 has a thickness of from 3 mm to 4 mm.

The planar antenna 49 is mounted on the front surface side of the printed wired board 44, and is electrically connected to the GPS communication circuit 68 mounted on the back surface side of the printed wired board 44. Moreover, a ground electrode is arranged on the back surface side of the planar antenna 49. A ground pattern is arranged on the printed wired board 44. Further, the ground electrode of the planar antenna 49 and the ground pattern on the printed wired board 44 are conducted to each other, and hence the printed wired board 44 functions as a ground plane.

The second magnetic shield plate 45 is arranged on the back surface side of the printed wired board 44. The second magnetic shield plate 45 blocks an external magnetic field so as to prevent the motors of the drive mechanism 42 from being affected by an external magnetic field and malfunctioning. As described above, the motor of the drive mechanism 42 is sandwiched between the first magnetic shield plate 38 and the second magnetic shield plate 45 from above and below. Further, the first magnetic shield plate 38 and the second magnetic shield plate 45 prevent a malfunction of the motors.

A case back conductive spring 47a is provided on the circuit cover plate 47. The case back conductive spring 47a is a leaf spring, and is brought into electric contact with the case back 10. Further, the ground pattern of the printed wired board 44 is brought into electric contact with the circuit cover plate 47. Therefore, the ground pattern of the printed wired board 44 is brought into contact with the case back 10. The case back 10 is brought into electric contact with the case 11. The case back 10 and the case 11 are formed of metal materials, and have conductivity. Therefore, the ground pattern of the printed wired board 44 is conducted to the case 11 and the case back 10, which are formed of metal, via the circuit cover plate 47, and hence the case 11 and the case back 10 are used as a ground plane. When the case back 10 and the case 11 are used as a ground plane, an area of the ground plane can be increased. As a result, an antenna gain is improved, and an antenna property can be improved.

A circular cutout 47b is formed in the center of the circuit cover plate 47. The secondary battery 48 is arranged at a position facing the cutout 47b, and the secondary battery 48 is brought into electric contact with the printed wired board 44.

The secondary battery 48 is a lithium ion battery formed in a circular shape in plan view. The secondary battery supplies power to the drive mechanism 42, the beacon communication circuit 65, the GPS communication circuit 68, the control display module 66, and the like. The secondary battery 48 is required to cause an electric current of 10 mA or more to flow at the time of reception of a satellite signal, and hence a battery with a capacity of several tens mAh is required. Thus, the secondary battery 48 has a diameter of approximately 20 mm or 16 mm, which is large. The secondary battery 48 has a thickness of 2 mm or less, and the secondary battery 48 is a thin battery.

Figure 6:
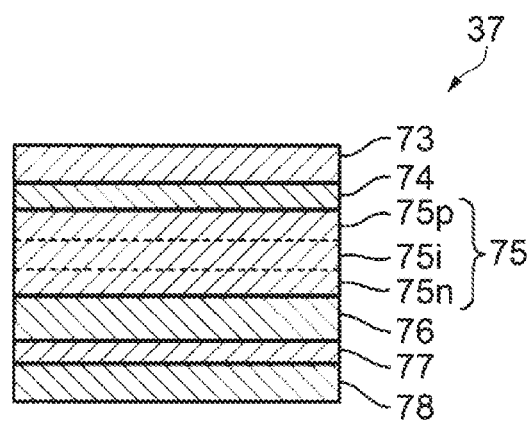
FIG. 6 is a schematic side cross-sectional view illustrating a structure of a solar cell panel.

FIG. 6 is a schematic side cross-sectional view illustrating a structure of the solar cell panel. As illustrated in FIG. 6, the solar cell panel 37 is obtained by laminating a front surface protection material 73, a front surface electrode 74, an amorphous silicon semiconductor thin film 75, a back surface electrode 76, an insulating film 77, and a back surface protection material 78. Further, when the solar cell panel 37 receives light, a voltage is generated between the front surface electrode 74 and the back surface electrode 76.

The front surface protection material 73 is transmissive, and allows light to pass through to enter the solar cell panel 37. The front surface electrode 74 is formed of a transparent electrode. The amorphous silicon semiconductor thin film 75 has a structure obtained by laminating a p-type semiconductor layer 75p, an intrinsic semiconductor layer 75i, and an n-type semiconductor layer 75n. The back surface electrode 76 is formed of aluminum. The insulating film 77 is formed of a resin film. The back surface protection material 78 is formed of stainless steel. Further, the back surface protection material 78 is used as a near field communication antenna.

Figure 7:
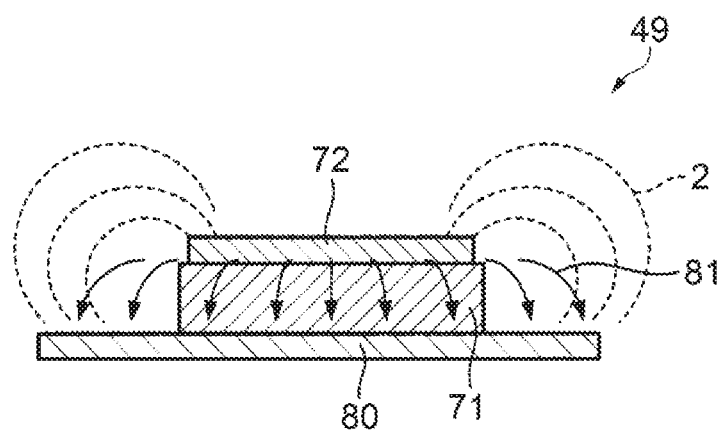
FIG. 7 is a schematic side cross-sectional view illustrating a planar antenna.

FIG. 7 is a schematic side cross-sectional view illustrating the planar antenna. The planar antenna is also referred to as a patch antenna. The planar antenna 49 has a structure in which the dielectric base material 71 is sandwiched between the antenna electrode 72 and a ground electrode 80. The ground electrode 80 is formed on the printed wired board 44. The first radio wave 2a is received by the planar antenna 49. The first radio wave 2a and electric force lines 81 at this time are in a mode illustrated in the drawing. When the patch antenna is in a rectangular shape, one side resonates in a half wavelength. When the patch antenna is in a circular shape, a diameter resonates in approximately 0.58 wavelength.

On the planar antenna 49, a strong electric field along the edge of the antenna electrode 72 is radiated from the edge of the antenna electrode 72 to the space. Thus, the electric force lines 81 in the vicinity of the antenna are stronger, and the metal and the dielectric body positioned in the vicinity of the antenna are liable to be affected. In the GPS reception, the outer case 8 and the antenna electrode 72, which are formed of metal, are preferably separated away from each other by a distance of at least 3 mm or more, ideally by a distance of approximately 4 mm.

Figure 8:
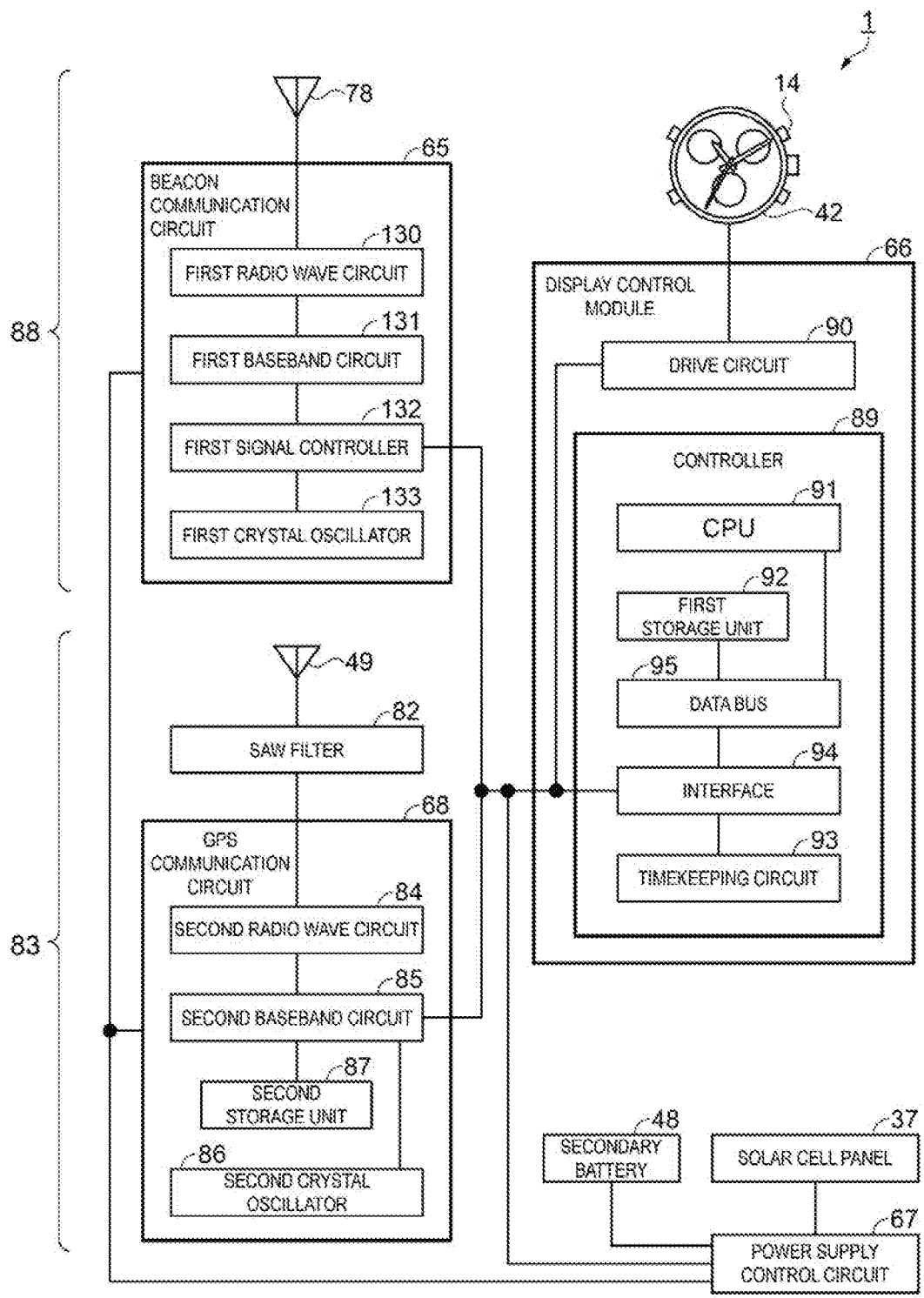
FIG. 8 is a block view illustrating a circuit configuration of the electronic watch.

FIG. 8 is a block diagram illustrating a circuit configuration of the electronic watch. The electronic watch 1 includes the control display module 66, the GPS communication circuit 68, the beacon communication circuit 65, the power source control circuit 67, and the like, which are arranged on the printed wired board 44.

The GPS communication circuit 68 is a circuit that performs communication by inputting a satellite signal received by the planar antenna 49 from the artificial satellite 3. Further, the beacon communication circuit 65 is a circuit that performs near field communication by inputting the second radio wave 2b received by a near field communication antenna achieved by the back surface protection material 78 of the solar cell panel 37.

The planar antenna 49 and a Surface Acoustic Wave (SAW) filter 82 are electrically connected to each other. Further, the SAW filter 82 and the GPS communication circuit 68 are electrically connected to each other. A GPS receiver 83 being a first receiver is constituted of the planar antenna 49, the SAW filter 82, and the GPS communication circuit 68. The GPS receiver 83 receives a satellite signal containing time information. The time information contained in the satellite signal is referred to as GPS time information. The GPS receiver receives a plurality of satellite signals containing satellite orbit information. Note that the SAW filter 82 is only required to be a Radio Frequency (RF) filter, and is not particularly limited.

The SAW filter 82 is a bandpass filter that allows a satellite signal with a frequency of 1.5 GHz to pass therethrough. The SAW filter 82 may be embedded in the GPS communication circuit 68.

The GPS communication circuit 68 processes a satellite signal having passed through the SAW filter 82. The GPS communication circuit 68 includes a second radio wave circuit 84, a second baseband circuit 85, a second crystal oscillator 86, and a second storage unit 87.

The second radio wave circuit 84 includes a Phase Locked Loop (PLL), a Voltage Controlled Oscillator (VCO), a Low Noise Amplifier (LNA), a mixer, an Intermediate Frequency (IF) amplifier, an Intermediate Frequency (IF) filter, and an Analog Digital Converter (ADC).

The PLL and the VCO generate a local oscillation signal with a frequency corresponding to a received frequency based on a clock generated by the second crystal oscillator 86. A satellite signal having passed through the SAW filter is amplified by the LNA, then mixed with the local oscillation signal from the VCO by the mixer, and down-converted into an Intermediate Frequency (IF) signal in an Intermediate Frequency (IF) band. The IF signal having been output from the mixer passes through the IF filter and the IF amplifier, and is converted into a digital signal by the ADC.

The second baseband circuit 85 includes a Digital Signal Processor (DSP), a Central Processing Unit (CPU), a Real Time Clock (RTC), and a Static Random Access Memory (SRAM). Further, the second baseband circuit 85 is connected to the second crystal oscillator 86 and the second storage unit 87.

Further, the second baseband circuit 85 acquires the GPS time information and location measurement information by being input the digital signal from the ADC of the second radio wave circuit 84 and performing correlation processing, location measurement calculation, and the like. The clock being the base of the oscillation signal is supplied from the second crystal oscillator 86 to the PLL of the second radio wave circuit 84 via the second baseband circuit 85. The second crystal oscillator is a crystal oscillator provided with a temperature compensation circuit.

The second storage unit 87 is a flash memory in which stored information can be re-written electrically. A time difference data base containing local time information, and the like are stored in the second storage unit 87. Information in the second storage unit 87 is acquired from a mobile information terminal, a computer, or the like through near field communication by the BLE, and is stored in the second storage unit 87.

The time difference database containing the local time information, satellite orbit data, satellite condition data, data on a receiver of the previous activation, and ionospheric layer data are stored in the second storage unit 87. With reference to the satellite condition data, a satellite that cannot be used can be excluded. With reference to the data on the receiver of the previous activation, location measurement performance of the GPS communication circuit 68 at the time of re-activation can be improved. With reference to the ionospheric layer data, location measurement can be performed at higher accuracy.

The back surface protection material 78 functioning as an antenna and the beacon communication circuit 65 are electrically connected to each other. Further, a beacon receiver 88 being a second receiver is constituted of the back surface protection material 78 and the beacon communication circuit 65. The beacon receiver 88 receives a beacon signal containing beacon identification information, which is transmitted from a radio station installed indoors.

The beacon communication circuit 65 includes a first radio wave circuit 130, a first baseband circuit 131, a first signal controller 132, and a first crystal oscillator 133. The first crystal oscillator 133 is a circuit that generates a master clock with a frequency of 16 MHz.

The first radio wave circuit 130 down-converts a near field communication signal received via the back surface protection material 78 into an Intermediate Frequency (IF) signal that is appropriate for demodulation. Moreover, the first radio wave circuit 130 converts the IF signal in a digital format, and outputs the signal to the first baseband circuit 131. Moreover, the first radio wave circuit 130 converts the signal in a digital format, which is input from the first baseband circuit 131, in an analog format. Further, the first radio wave circuit 130 up-converts the IF signal, which is modulated based on transmit information, into a high-frequency signal, and outputs the signals to the back surface protection material 78.

The first baseband circuit 131 includes a demodulation unit and a modulation unit. Here, the demodulation unit demodulates reception information from the IF signal in a digital format that is output from the first radio wave circuit, and supplies the information to the first signal controller 132. The reception information is information contained in the signal transmitted from the beacon 4. Further, the modulation unit modulates a carrier based on the transmission information supplied from the first signal controller 132. Moreover, the modulation unit generates the IF signal in a digital formation, and supplies the signal to the first radio wave circuit 130.

The first signal controller 132 controls the first radio wave circuit 130 and the first baseband circuit 131. Further, the first signal controller 132 performs communication by the BLE with the beacon 4.

The power source control circuit 67 is electrically connected to the solar cell panel 37 and the secondary battery 48. The power source control circuit 67 includes a charge control circuit, a voltage detection circuit, a first regulator, a second regulator, and a voltage detection circuit.

When light enters the solar cell panel 37, and the solar cell panel 37 generates power, the charge control circuit supplies the power obtained by this power generation to the secondary battery 48, and electrically charges the secondary battery 48. The secondary battery 48 supplies drive power to the control display module 66 and the beacon communication circuit 65 via the first regulator. Moreover, the secondary battery 48 supplies drive power to the GPS communication circuit 68 via the second regulator. As described above, power source means that supplies drive power is constituted of the solar cell panel 37, the secondary battery 48, and the power source control circuit 67.

The charge control circuit is controlled by a controller 89, and controls electrical connection and disconnection between the solar cell panel 37 and the secondary battery 48. When the voltage detection circuit detects a voltage of the solar cell panel 37, the charge control circuit electrically disconnects the solar cell panel 37 and the secondary battery 48.

The voltage detection circuit monitors an output voltage of the secondary battery 48, and outputs the resultant to the controller 89. That is, the voltage detection circuit detects a battery residual amount of the secondary battery 48 being the power source means. The voltage of the secondary battery 48, which is detected by the voltage detection circuit, is input, and the controller 89 controls reception processing.

The voltage detection circuit detects a power generation voltage of the solar cell panel 37. The power generation voltage is input to the controller 89. Based on the power generation voltage of the solar cell panel 37, the controller 89 determines whether the electronic watch 1 is arranged outside of a building.

The control display module 66 includes a drive circuit that drives the controller 89 and the drive mechanism 42. Further, the controller 89 includes a Central Processing Unit (CPU) 91 that execute various types of calculation processing as a processor, a first storage unit 92 being a storage unit that stores various types of information, and a timekeeping circuit 93. In addition, the controller 89 includes an input/output interface 94 and a data bus 95. The timekeeping circuit 93, the drive circuit 90, the beacon communication circuit 65, and the GPS communication circuit 68 are connected to the CPU 91 via the input/output interface 94 and the data bus 95.

The timekeeping circuit 93 includes a crystal oscillator, and keeps time using a reference signal output from the crystal oscillator. The timekeeping circuit 93 is also referred to as a Real Time Clock (RTC). Time kept by the timekeeping circuit 93 is referred to as time data.

The first storage unit 92 includes a re-writable nonvolatile memory. Specifically, a nonvolatile memory, such a flash memory and a ROM, is used as the first storage unit 92. The nonvolatile memory can maintain storage without power consumption. Various programs executed by the CPU 91 are stored in the first storage unit 92. In addition, the GPS time information input from the GPS communication circuit 68 and the location measurement information are stored in the first storage unit 92.

In addition, the time difference information corresponding to the location measurement information is stored in the first storage unit 92. In addition, predetermined beacon identification information output from the beacon communication circuit 65 and the time difference information corresponding to the beacon identification information are stored in the first storage unit 92. In addition, the first storage unit 92 stores programs in which a control procedure of an operation of time correction and a calculation procedure of the time correction are written. The first storage unit 92 is re-writable, and hence time difference information corresponding to identification information of a beacon to be used can be changed.

Figure 9:
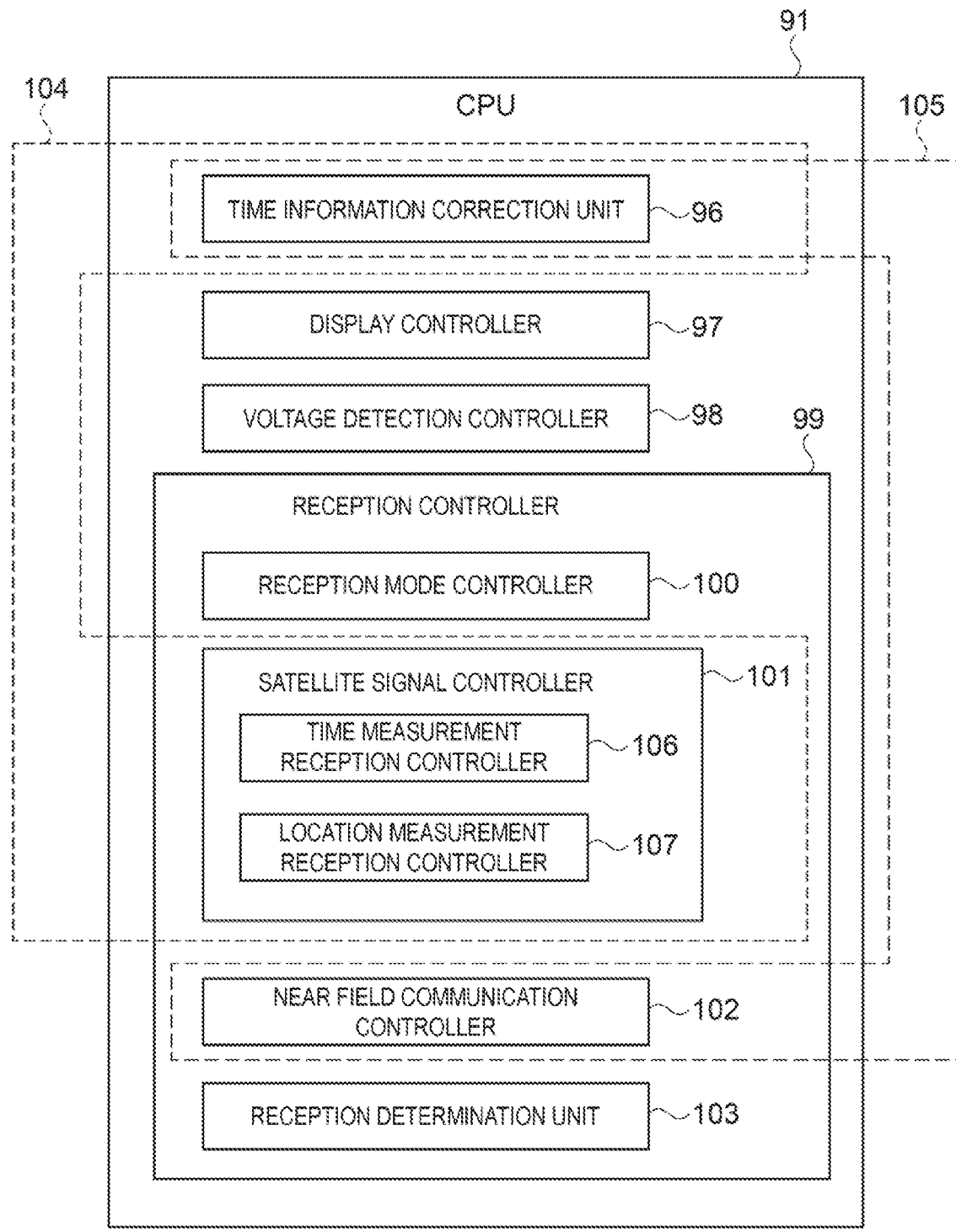
FIG. 9 is a block view illustrating a configuration of a function of a CPU.

FIG. 9 is a block diagram illustrating a configuration of a function of the CPU. The CPU 91 has a function achieved by executing the programs stored in the first storage unit 92. As illustrated in FIG. 9, the function of the CPU 91 includes a time information correction unit 96 being a first time correction unit and a second time correction unit. The time information correction unit 96 activates the GPS communication circuit 68, receives a satellite signal, acquires GPS time information from the received satellite signal, and corrects time. As described above, the time information correction unit 96 corrects time using the GPS time information received from the GPS receiver 83. In addition, location information is acquired from a received satellite signal, and the time data is corrected. In addition, the time information correction unit 96 corrects a time difference using the beacon signal received by the beacon receiver 88 and the time difference information stored in the first storage unit 92.

In addition, the function of the CPU 91 includes a display controller 97. In a normal mode, the display controller 97 controls the drive circuit 90 based on the time data, and the center hour hand 22, the center minute hand 21, and the center second hand 18 display time being local time. Moreover, the display controller 97 causes the first sub hour hand 29 and the first sub minute hand 28 to display time being home time. Moreover, when the electronic watch 1 is used as a stop watch, the display controller 97 causes the third sub pointer 35 to display elapsed seconds. Further, the display controller 97 causes the second sub pointer 32 to display a battery residual amount and a reception control state.

In addition, the function of the CPU 91 includes a voltage detection controller 98. The voltage detection controller 98 outputs an instruction signal of causing the power source control circuit 67 to detect a voltage of the secondary battery 48, that is, a battery residual amount, and a power generation amount of the solar cell panel 37. Further, the power source control circuit 67 detects a voltage at a certain time interval, and outputs the voltage to the voltage detection controller 98. As described above, the voltage detection controller 98 controls an operation of the power source control circuit 67.

In addition, the function of the CPU 91 includes a reception controller 99. The reception controller 99 includes a reception mode controller 100, a satellite signal reception controller 101, a near field communication controller 102 being a second time correction unit, and a reception determination unit 103. Further, the first time correction unit 104 is constituted of the time information correction unit 96 and the satellite signal reception controller 101. Moreover, the second time correction unit 105 is constituted of the time information correction unit 96 and the near field communication controller 102.

The reception mode controller 100 detects predetermined operations of the crown 13 and the buttons 14. Further, the reception mode controller 100 controls execution of various types of the reception processing. An operation device is constituted of the reception mode controller 100, and the crown 13 and the buttons 14. Further, the operation device accepts an instruction of receiving a beacon signal, which is given by the operator 5. In addition, the operation device accepts an instruction of receiving a satellite signal, which is given by the operator 5. In addition, the operation device accepts an instruction of receiving time measurement reception of a satellite signal, which is given by the operator 5. Various instruction contents are allocated to the operations of the buttons 14 and the crown 13.

The satellite signal reception controller 101 includes a time measurement reception controller 106. The time measurement reception controller 106 activates the GPS communication circuit 68. Further, the time measurement reception controller 106 receives at least one satellite signal, and the time measurement reception controller 106 executes the time measurement reception processing in which the GPS time information is acquired from the received satellite signal. The time information correction unit 96 corrects the time data using the GPS time information.

The satellite signal reception controller 101 includes a location measurement reception controller 107 being a location calculation unit. The location measurement reception controller 107 activates the GPS communication circuit 68, and receives satellite signals from the plurality of artificial satellites 3. Further, the location measurement reception controller 107 executes the location measurement reception processing in which location measurement is performed based on the plurality of received satellite signals. The time information correction unit 96 corrects the time data using the GPS time information acquired in the location measurement reception processing. Specifically, the GPS communication circuit 68 receives satellite signals from the three or more artificial satellites 3. As described above, the first time correction unit 104 includes the location measurement reception controller 107 that calculates a reception location from a plurality of pieces of satellite orbit information.

The near field communication controller 102 outputs, to the beacon communication circuit 65, an instruction signal of receiving the second radio wave 2*b*. The beacon communication circuit 65 receives the instruction signal, and receives the second radio wave 2*b* transmitted from the beacon 4 near the electronic watch 1. The beacon communication circuit 65 and the beacon 4 perform near field communication by Bluetooth LE. Further, the near field communication controller 102 acquires identification information of the beacon 4 through the near field communication, and outputs the information to the time information correction unit 96.

The reception determination unit 103 has a function of determining whether reception of the GPS time information and correction of the time data are successfully completed. For example, during the time measurement reception processing, the reception determination unit 103 compares the GPS time information acquired from the received satellite signal and the time data calculated by the timekeeping circuit 93. The GPS time information is referred to as Z count data. When a difference between the GPS time information of the satellite signal and the time data of the timekeeping circuit 93 is large, processing for preventing erroneous correction is executed.

In the processing for preventing erroneous correction, the GPS communication circuit 68 receives a satellite signal again, and acquires the GPS time information again. In addition, when satellites signals are received from a plurality of satellites, the GPS time information of the satellite signals acquired from the plurality of satellites and the time data of the timekeeping circuit 93 are compared. Further, when a difference between the GPS time information of the satellite signal and the time data of the timekeeping circuit 93 is small, the time information correction unit 96 performs the time correction.

Figure 10:
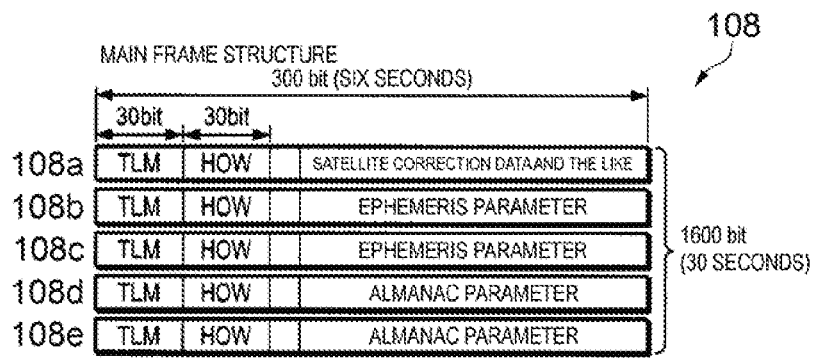
FIG. 10 is a view illustrating a configuration of a navigation message.
Figure 11:
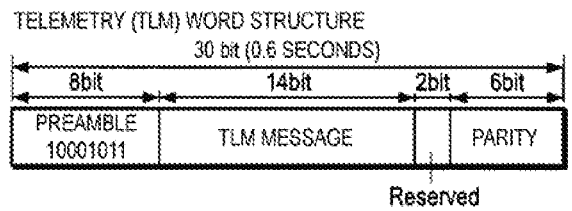
FIG. 11 is a view illustrating a configuration of a navigation message.
Figure 12:
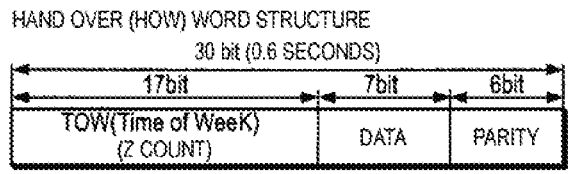
FIG. 12 is a view illustrating a configuration of a navigation message.

Next, a satellite signal received by the GPS communication circuit 68 is described. In the GPS, a navigation message is transmitted from a satellite signal. Each of FIG. 10 to FIG. 12 is a view illustrating a configuration of a navigation message. As illustrated in FIG. 10, the navigation message is generated as data with a main frame 108 having the total bit number of 1,500 as one unit. The main frame 108 is divided into five sub frames including the first sub frame 108*a*, the second sub frame 108*b*, the third sub frame 108*c*, the fourth sub frame 108*d*, and the fifth sub frame 108*e*, each of which is 300 bits. Data in one sub frame is transmitted from each of the artificial satellites 3 in six seconds. Therefore, data in one main frame is transmitted from each of the artificial satellites 3 in 30 seconds.

The first sub frame 108*a* contains satellite correction data containing week number data and a satellite condition state. The week number data is information indicating a week containing GPS time information at present. The starting point of the GPS time information is 00:00:00 on Jan. 6, 1980 in coordinated universal time, and the week starting from this day is given with week number 0. Coordinated universal time is also displayed as UTC (Universal Time, Coordinated). The week number data is updated weekly. The satellite condition state is a code indicating whether abnormality is cause in the satellite. By checking the code, the GPS receiver 83 does not use a signal from a satellite with abnormality.

The second sub frame 108*b* and the third sub frame 108*c* contain information specific to each of the satellites. In the second sub frame 108*b* and the third sub frame 108*c*, the artificial satellite 3 transmit the same contents repeated at every time. Specifically, clock correction information and orbit information of an own satellite that performs transmitting are contained. The orbit information of the own satellite is referred to as an ephemeris. The fourth sub frame 108*d* and the fifth sub frame 108*e* contain orbit information of all the satellites and ionospheric layer correction information. The orbit information of all the satellites is referred to as an almanac. The information has a large number of data pieces, and hence is divided into pages from page 1 to page 25. Further, the orbit information of all the satellites are stored in the sub frames. 25 frames are required to transmit contents in all the pages, and hence it takes 12 minutes and 30 seconds to receive all the information of the navigation message.

Moreover, each of the first sub frame 108*a* to the fifth sub frame 108*e* contains a 30-bit Telemetry Word (TLM) in which TLM data is stored and a 30-bit Hand Over Word (HOW) word in which HOW data is stored, from the beginning. Therefore, the TLM word and the HOW word are transmitted from the artificial satellite 3 at a six-second interval whereas the satellite correction data such as the week number data, an ephemeris parameter, and an almanac parameter are transmitted at a 30-second interval.

As illustrated in FIG. 11, the TLM word contains preamble data, a TLM message, a Reserved bit, and parity data.

As illustrated in FIG. 12, the HOW word contains GPS time information called Time of Week (TOW). The TOW is also referred to as "Z count data". In the Z count data, a time period elapsed from 0 AM on every Sunday is displayed in the second unit, and is returned to zero at 0 AM on next Sunday. That is, the Z count data is information in the second unit, which is indicated weekly from the beginning of a week. The Z count data indicates the GPS time information of transmission of a top bit in subsequent sub frame data. For example, the Z count data of the first sub frame 108*a* indicates the GPS time information of transmission of the top bit in the second sub frame 108*b*. Further, the HOW word contains three-bit data indicating an Identification (ID) of the sub frame. The ID of the sub frame is referred to as an ID code. That is, the HOW words of the first sub frame 108*a* to the fifth sub frame 108*e* illustrated in FIG. 10 contain ID codes of "001", "010", "011", "100", and "101", respectively. Note that a TOW of one satellite signal is only required to be acquired during the GPS time measurement reception. Under an environment with satisfactory conditions, it takes approximately three seconds as a time period for receiving the GPS time information. Hereinafter, it is assumed that the TOW and the Z count data are the GPS time information.

Next, a beacon signal received by the beacon communication circuit 65 is described. In the beacon 4, communication by the BLE is performed. When communication is established with the BLE, the beacon 4 transmits a signal called an advertise packet. Each of FIG. 13 to FIG. 15 is a view illustrating a configuration of an advertise packet.

Figure 13:
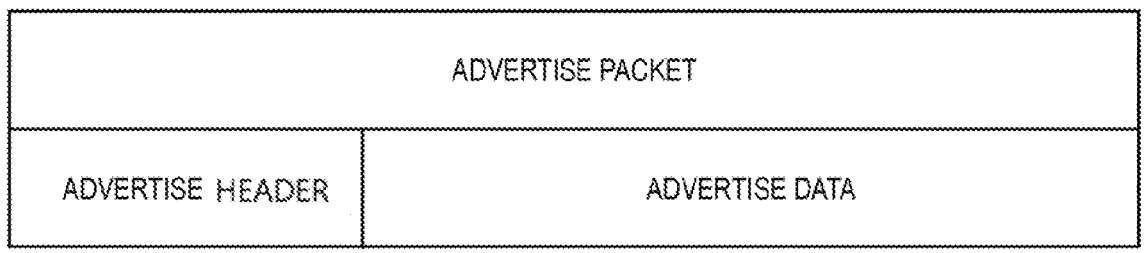
FIG. 13 is a view illustrating a configuration of an advertise packet.

As illustrated in FIG. 13, the advertise packet has an advertise header and advertise data. A plurality of pieces of information such as an ID code are stored in the advertise data. As illustrated in FIG. 14, the advertise data contains a data header, manufacturer specific information, and a data footer. Various pieces of information such as an ID code is stored in the manufacturer specific information.

As illustrated in FIG. 15, information of an information header, a company ID, a beacon header, a Universally Unique Identifier (UUID), a Major value, a Minor value, and TxPower is stored in the manufacturer specific information. When the beacon 4 is installed in a certain building, the UUID being the beacon identification information is identification information of the building. The Major value is identification information indicating a floor, and the Minor value is identification information indicating a room. TxPower indicates signal intensity. A distance between the electronic watch 1 and the beacon 4 can be detected based on TxPower and intensity of the second radio wave 2b received by the beacon communication circuit 65. The near field communication controller 102 uses information of the UUID stored in the advertise packet. Using the UUID, a location of the electronic watch 1 can be recognized.

FIG. 16 is a view illustrating time zone data. As illustrated in FIG. 16, time zone data contains time zone data of GPS location information and time zone data of beacon information. The time zone data is stored in the first storage unit 92.

The time zone data of the GPS location information is used when the time information correction unit 96 corrects time using the GPS location information. The time zone data of the GPS location information contains block numbers, latitude information, longitude information, and time difference information. The block numbers are numbers each of which is allocated to each of the time zones. The latitude information and the longitude information are information of a latitude and a longitude for indicating a specific location on earth. Further, the time difference information indicates a time difference from coordinated universal time. For example, the time difference information indicates that a time difference from coordinated universal time is nine hours in a location with block number 1.

In addition to data on the major cities in the world, the time zone data of the GPS location information preferably stores data on locations that the operator 5 is highly likely to visit. With the limited number of data pieces, a storage capacity of the first storage unit 92 can be reduced.

The time zone data of the beacon information is used when the time information correction unit 96 corrects time using the UUID of the beacon signal. The time zone data of the beacon information contains beacon numbers, UUIDs, and time difference information. The beacon numbers are numbers each of which is allocated to each of beacons in buildings. The UUID is information contained in the beacon signal. The UUID is a character string constituted of twelve digits including alphabets and numerals. Further, the time difference information indicates a time difference from coordinated universal time. For example, the time difference information indicates that a time difference from coordinated universal time is three hours in a location with beacon number 1.

The time zone data of the beacon information preferably stores data on buildings that the operator 5 is highly likely to visit. Further, only data on buildings that the operator 5 decides to visit may be stored in the time zone data of the beacon information. As described above, the first storage unit stores the UUIDs and the time difference information corresponding to the UUIDs. The time information correction unit 96 inputs the UUID contained in the beacon signal from the beacon receiver 88. Further, the time information correction unit 96 acquires the time difference information corresponding to the beacon 4 using the time zone data of the beacon information. Next, the time information correction unit 96 corrects time using the UUID of the beacon signal received by the beacon receiver 88 and the time difference information stored in the first storage unit 92.

Figure 17:
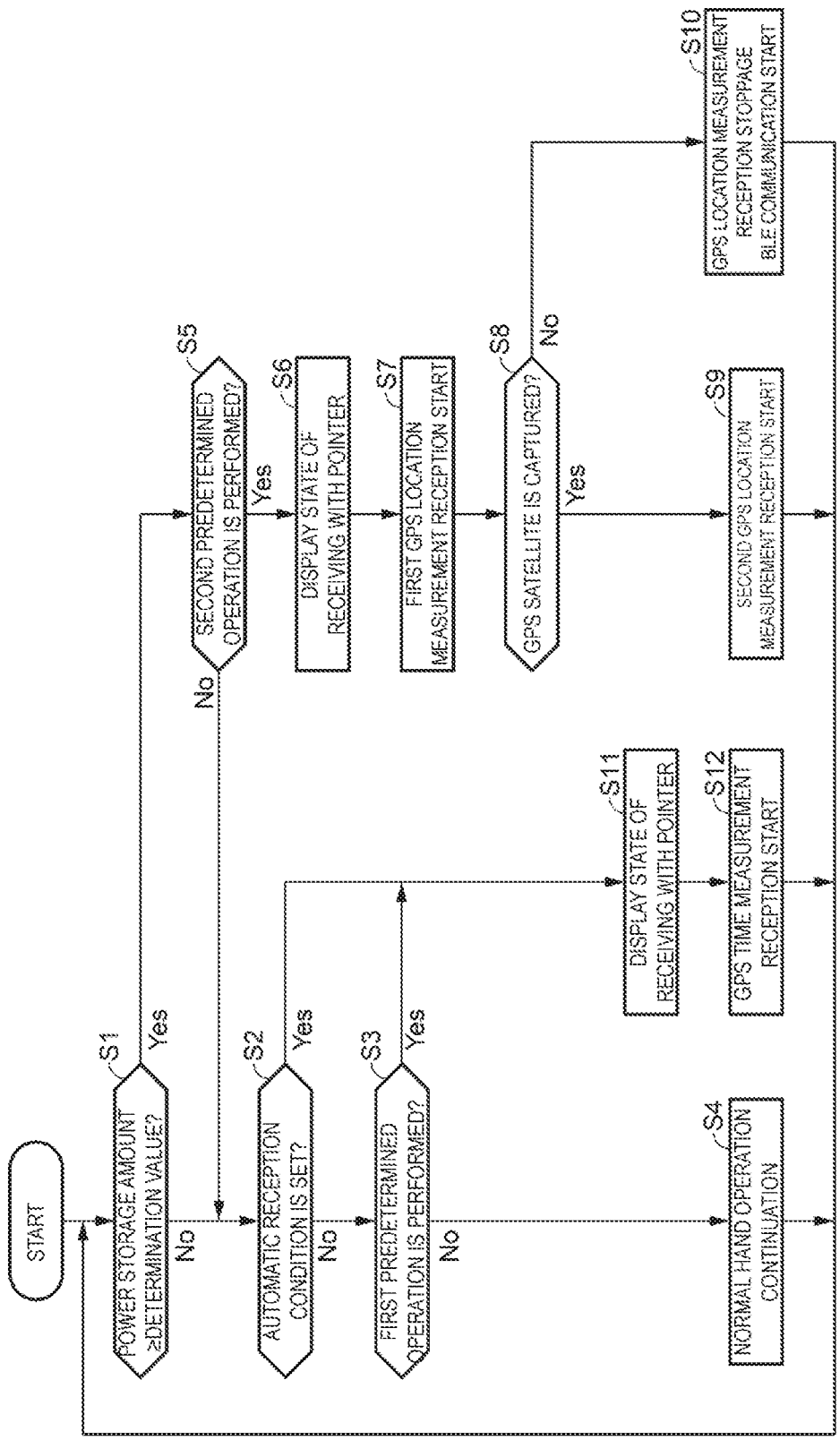
FIG. 17 is a flowchart of a method of correcting time and a time difference.
Figure 20:
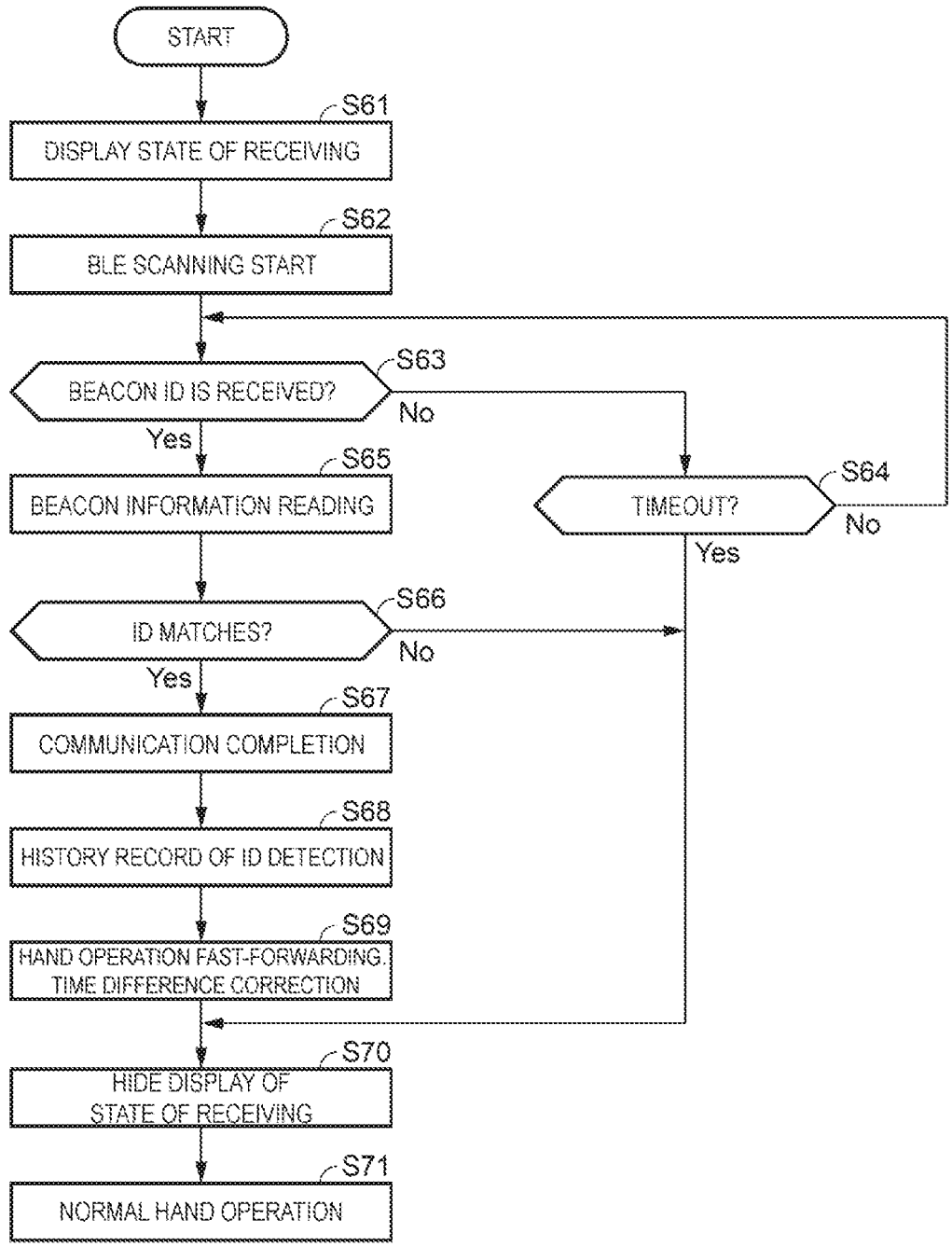
FIG. 20 is a flowchart of a GPS location measurement reception stop and BLE communication start step.

Next, a method of correcting time and a time difference of the electronic watch 1 described above is described with reference to FIG. 17 and FIG. 20. Each of FIG. 17 and FIG. 20 is a flowchart of a method of correcting time and a time difference. A method of correcting time and a time difference is performed in the electronic watch 1. In the flowchart of FIG. 17, Step S1 is a step of determining whether a power storage amount is equal to or more than a determination value. In Step S1, the power source control circuit 67 detects a power storage amount in the secondary battery 48 at a 60-second interval. The power storage amount of the secondary battery 48 and a voltage of the secondary battery 48 are mutually related, and hence the power source control circuit 67 estimates the power storage amount by measuring the voltage of the secondary battery 48. Further, the voltage detection controller 98 compares the power storage amount of the secondary battery 48 with a first determination value.

As the first determination value, such power storage amount is set that system-down of the controller 89 is avoided even when the GPS receiver 83 executes reception processing of satellite signals. In the present exemplary embodiment, for example, the power storage amount of the first determination value is 3.6V when converted into a voltage. When the power storage amount is equal to or more than the first determination value, the voltage detection controller 98 gives a determination result as "Yes", and the procedure proceeds to Step S5. When the power storage amount is less than the first determination value, the controller 89 gives a determination result as "No", and the procedure proceeds to Step S2.

Step S2 is a step of determining whether an automatic reception condition is set. In this step, the reception mode controller 100 determines whether the automatic reception condition is satisfied. The automatic reception condition is that a setting of performing automatic time correction at a designated time is given and that the set time for the time correction arrives. In addition, the automatic reception condition is that a setting of performing the automatic time correction when the solar cell panel 37 starts power generation outside of a building is given and that the solar cell panel 37 starts power generation.

When the reception mode controller 100 determines that the automatic reception condition is given, the reception mode controller 100 gives a determination result as "Yes", and the procedure proceeds to Step S11. When the reception mode controller 100 determines that the automatic reception condition is not satisfied, the reception mode controller 100 gives a determination result as "No", and the procedure proceeds to Step S3.

Step S3 is a step of determining whether a first predetermined operation is performed. The first predetermined operation is an operation of pressing the first button 14a. When the operator 5 presses the first button 14a, the drive circuit 90 detects that the first button 14a is pressed. Further, the drive circuit 90 outputs a signal indicating pressing of the first button 14a to the CPU 91.

When the CPU 91 inputs the signal indicating pressing of the first button 14a from the drive circuit 90, the CPU 91 gives a determination result for presence of the first predetermined operation as "Yes", and the procedure proceeds to Step S11. When the CPU 91 does not input the signal indicating pressing of the first button 14a from the drive circuit 90, the CPU 91 gives a determination result for presence of the first predetermined operation as "No", and the procedure proceeds to Step S4.

Step S4 is a normal hand operation continuation step. In this step, the controller 89 continues a normal hand operation. Next, the process proceeds to Step S1. Further, the controller 89 repeatedly executes processing in Step S1 to Step S4 at a predetermined time interval.

Step S5 is a step of determining whether a second predetermined operation is performed. The second predetermined operation is an operation of pressing the second button 14b. When the operator 5 presses the second button 14b, the drive circuit 90 detects that the second button 14b is pressed. Further, the drive circuit 90 outputs a signal indicating pressing of the second button 14b to the CPU 91.

The second button 14b is a button for canceling a "flight mode". The "flight mode" is a mode indicating that the electronic watch 1 is located inside an airplane. The operator operates the second button 14b when stepping out of the airplane. When the "flight mode" is canceled, the beacon receiver 88 receives a beacon signal. Thus, the second button 14b functions as an operation device that performs a reception instruction of a beacon signal.

When the CPU 91 inputs the signal indicating pressing of the second button 14b, the CPU 91 gives a determination result for presence of the second predetermined operation as "Yes", and the procedure proceeds to Step S6. When the CPU 91 does not input the signal indicating pressing of the second button 14b, the CPU 91 gives a determination result for presence of the second predetermined operation as "No", and the procedure proceeds to Step S2.

Step S6 is a step of displaying a state of receiving with the pointer. In this step, the second sub pointer 32 points at the mark "4+". The second sub pointer 32 points at the mark "4+" to indicate that measurement of location is performed. Next, the process proceeds to Step S7.

Step S7 is a first GPS location measurement reception start step. In this step, the location measurement reception controller 107 outputs a control signal to the GPS receiver 83 to start the location measurement reception processing. When start of the location measurement reception processing is instructed, the GPS receiver 83 executes processing of searching satellite signals transmitted from the artificial satellites 3. Next, the process proceeds to Step S8.

Step S8 is a step of determining whether capture of the GPS satellites is performed. In this step, the location measurement reception controller 107 inputs, from the GPS receiver 83, data on signal intensity of the satellite signals. Further, when the signal intensity of the plurality of satellite signals is equal to or more than a determination value, the location measurement reception controller 107 determines that the satellite signals transmitted from the artificial satellites 3 can be captured. Further, the location measurement reception controller 107 determines whether the predetermined number or more of satellites signals required for location measurement can be captured. The predetermined number is at least three, but is set to four normally.

When the predetermined number or more of satellite signals required for location measurement can be captured, the location measurement reception controller 107 gives a determination result for capture of the satellite signals as "Yes", and the procedure proceeds to Step S9. When the predetermined number or more of satellite signals required for location measurement cannot be captured, the location measurement reception controller 107 gives a determination result for capture of the satellite signals as "No", and the procedure proceeds to Step S10.

Step S9 is a second GPS location measurement reception start step. In this step, three or more satellite signals are received, and a location of the electronic watch 1 is measured. Next, the process proceeds to Step S1. Step S10 is a GPS location measurement reception stop and BLE communication start step. In this step, the GPS location measurement reception is stopped, the BLE communication is started.

As described above, when the GPS receiver 83 cannot receive a plurality of satellite signals, the GPS receiver 83 is stopped, and the beacon receiver 88 receives a beacon signal. Further, when the second button 14b accepts a reception instruction, the beacon receiver 88 receives a beacon signal. Next, the process proceeds to Step S1.

Step S11 is a step of displaying a state of receiving with the pointer. In this step, the second sub pointer 32 points at the mark "1". The second sub pointer 32 points at the mark "1" to indicate that measurement of time is performed. Next, the process proceeds to Step S12.

Step S12 is a GPS time measurement reception start step. In this step, one satellite signal is received, and information regarding time is received. Next, the process proceeds to Step S1.

Figure 18:
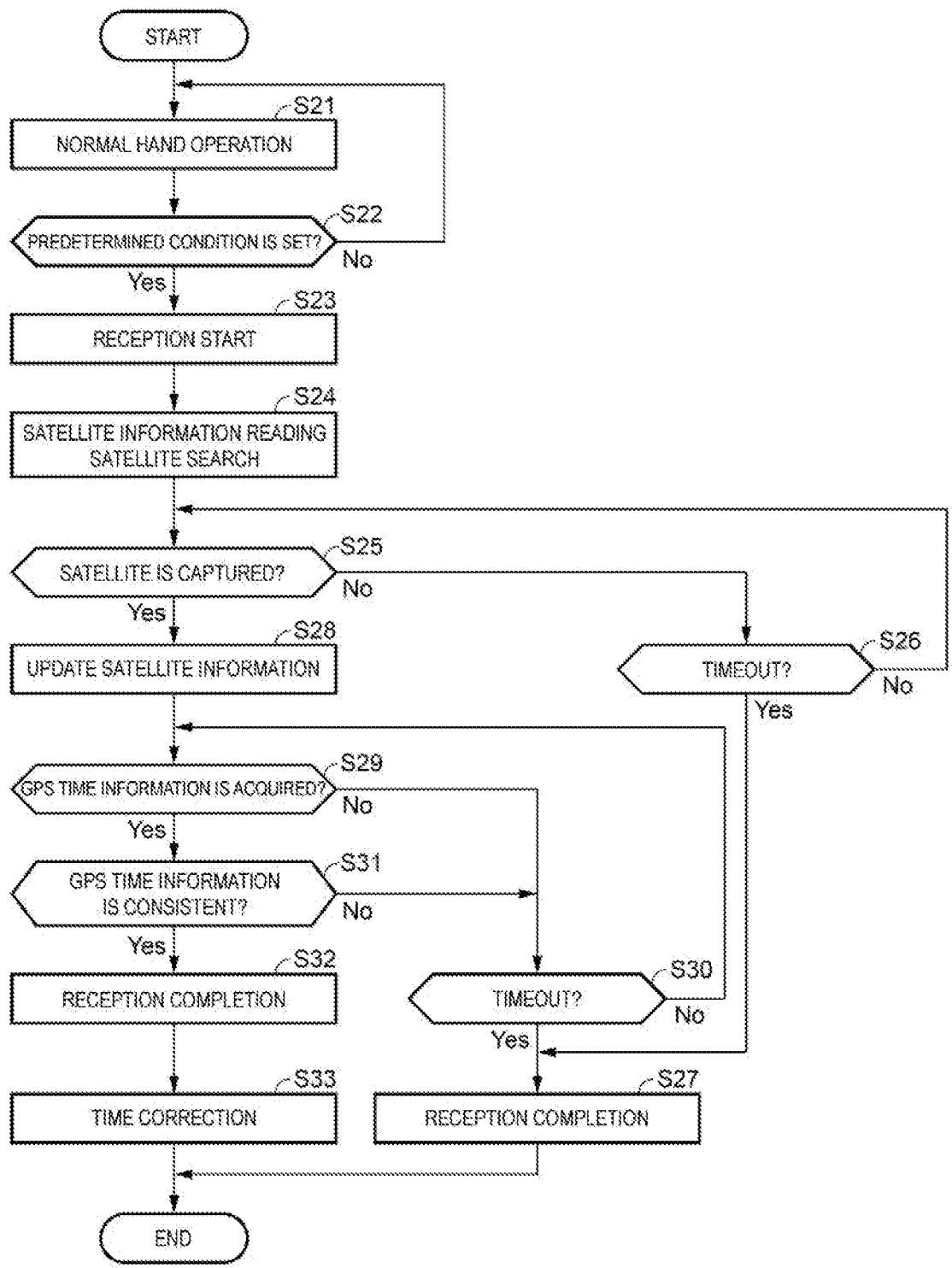
FIG. 18 is a flowchart of a GPS time measurement reception start step.

FIG. 18 is a flowchart of a GPS time measurement reception start step in Step S12. In FIG. 18, Step S21 is a normal hand operation step. In this step, the controller 89 performs a normal hand operation. Next, the process proceeds to Step S22.

Step S22 is a step of determining whether predetermined conditions are satisfied. When the predetermined conditions are satisfied, a satellite signal is receivable. The conditions includes a condition whether the electronic watch 1 is located outside of a building. When the electronic watch 1 is located outside the a building, the solar cell panel 37 generates power. The power source control circuit 67 detects a voltage of power generated by the solar cell panel 37, and outputs the resultant to the time measurement reception controller 106. When the voltage of the power generated by the solar cell panel 37 is more than a determination value, the time measurement reception controller 106 determines that the electronic watch 1 is located outside a building. Further, when the voltage of the power generated by the solar cell panel 37 is less than a predetermined value, the time measurement reception controller 106 determines that the electronic watch 1 is located indoors.

When the time measurement reception controller 106 determines that the electronic watch 1 is located inside the building, the determination result is given as "No", and the procedure proceeds to Step S21. When the time measurement reception controller 106 determines that the electronic watch 1 is located outside the building, the determination result is given as "Yes", and the procedure proceeds to Step S23.

Step S23 is a reception start step. In this step, the time measurement reception controller 106 outputs a control signal to the GPS receiver 83 to start the time measurement reception processing. Next, the process proceeds to Step S24.

Step S24 is a satellite information reading and satellite searching step. In this step, the GPS receiver 83 starts searching for satellite signals. The second baseband circuit 85 reads the satellite information of the artificial satellites 3, which are captured at the time of the previous reception, out from the second storage unit 87, and starts searching for the artificial satellites 3 that are captured previously. Further, the GPS receiver 83 receives satellite signals containing time information. Next, the process proceeds to Step S25.

Step S25 is a step of determining whether satellites are captured. In this step, the satellite signals received by the planar antenna 49 along with start of reception of the satellite signals are extracted by the SAW filter 82, and then supplied to the second radio wave circuit 84. The second radio wave circuit 84 converts the satellite signals into digital signals in an intermediate frequency band, and outputs the signals to the second baseband circuit 85.

Using the digital signals in an intermediate frequency band, which are received from the second radio wave circuit 84, the second baseband circuit 85 determines whether the artificial satellites 3 are captured. Further, the second baseband circuit transmits the determination result to the time measurement reception controller 106. When the second baseband circuit 85 cannot capture a satellite signal, the determination result is given as "No", and the procedure proceeds to Step S26. When the second baseband circuit 85 captures a satellite signal, the determination result is given as "Yes", and the procedure proceeds to Step S28.

Step S26 is a step of determining whether time-out is caused. In this step, the time measurement reception controller 106 compares an elapsed time period from the time when measurement reception starts and a determination time period. For example, the determination time period is set to 15 seconds. When the elapsed time period from the time when measurement reception starts falls within the determination time period, the time measurement reception controller 106 gives a determination result as "No", and the procedure proceeds to Step S25. When the elapsed time period from the time when measurement reception starts exceeds the determination time period, the time measurement reception controller 106 gives a determination result as "Yes", and the procedure proceeds to Step S27.

Step S27 is a reception completion step. In this step, the time measurement reception controller 106 completes the reception by the GPS receiver 83. Next, the process proceeds to Step S1.

Step S28 is a step of updating and storing the satellite information. In this step, the second storage unit 87 stores the data on the satellite signals captured by the second baseband circuit 85. The second baseband circuit 85 receives the satellite information contained in the captured satellite signals of the artificial satellites 3, via the second radio wave circuit 84. Further, the second baseband circuit 85 updates the satellite information stored in the second storage unit 87 to the satellite information that is newly received. The second storage unit 87 stores the satellite data captured at the time of the past reception together with information indicating a reception time hour. In Step S28, the time measurement reception controller 106 updates newly captured satellite data.

The satellite data stored in the second storage unit 87 is used in Step S24. In general, the artificial satellite 3 orbits round the earth for approximately 12 hours, and the earth itself rotates. Thus, when the position information satellites are searched at the same location 24 hours later, it is highly possible that the signals of the same artificial satellites 3 as the signals of the artificial satellites 3 captured previously can be captured. With reference to the reception history of the satellite signals, the second radio wave circuit 84 reduces a time period required for receiving the satellite signals. Next, the process proceeds to Step S29.

Step S29 is a step of determining whether the GPS time information is acquired. In this step, it is determined whether the second baseband circuit 85 acquires the GPS time information from the received satellite signals. When the GPS time information cannot be acquired from the satellite signals captured by the second baseband circuit 85, the second baseband circuit 85 gives a determination result as "No", and the procedure proceeds to Step S30. When the GPS time information can be acquired from the satellite signals captured by the second baseband circuit 85, the second baseband circuit 85 gives a determination result as "Yes", and the procedure proceeds to Step S31.

Step S30 is a step of determining whether time-out is caused. In this step, the second baseband circuit 85 compares an elapsed time period from the time at which the procedure proceeds to Step S29 and a determination time period. For example, in the present exemplary embodiment, the determination time period is set to 60 seconds. When the elapsed time period from the time at which the procedure proceeds to Step S29 falls within the determination time period, the second baseband circuit 85 gives a determination result as "No", and the procedure proceeds to Step S29. When the elapsed time period from the time at which the procedure proceeds to Step S29 exceeds the determination time period, the second baseband circuit 85 gives a determination result as "Yes", and the procedure proceeds to Step S27. When the GPS time information cannot be acquired from the satellite signals, the acquisition of the GPS time information is stopped, and power consumption is reduced.

Note that, when the second baseband circuit 85 can capture satellite signals from the plurality of artificial satellites 3, the time data may be acquired from a satellite signal with higher signal intensity of the satellite signal. The GPS time information is acquired from each of the plurality of artificial satellites 3, and consistency of the GPS time information is confirmed. In this manner, am acquisition state of the GPS time information may be determined.

Step S31 is a step of determining whether the GPS time information is consistent. In this step, the reception determination unit 103 confirms consistency of the GPS time information captured by the second baseband circuit 85. Specifically, when the second baseband circuit 85 captures the satellite signals, the reception determination unit 103 compares the time data calculated by the timekeeping circuit 93 and the GPS time information. Further, the reception determination unit 103 confirms consistency based on whether a difference between the GPS time information acquired by the GPS receiver 83 and the time data calculated by the timekeeping circuit 93 falls within a determination value. For example, in the present exemplary embodiment, the determination value is set to five seconds. When the difference between the GPS time information captured by the second baseband circuit 85 and the time data calculated by the timekeeping circuit 93 is more than the determination value, the reception determination unit 103 determines that the GPS time information and the time data are consistent.

When the GPS time information and the time data are not consistent, the reception determination unit 103 gives a determination result as "No", and the procedure proceeds to Step S30. When the GPS time information and the time data are consistent, the reception determination unit 103 gives a determination result as "Yes", and the procedure proceeds to Step S32.

In addition, the second radio wave circuit 84 receives a plurality of sub frames at a six-second interval, and outputs the sub frames to the second baseband circuit 85. Further, the second baseband circuit 85 inputs a plurality of pieces of GPS time information from the second radio wave circuit 84, and outputs the pieces to the reception determination unit 103. When the plurality of pieces of GPS time information are consistent to each other, the reception determination unit 103 determines that the acquired GPS time information is accurate. Further, the reception determination unit 103 gives a determination result as "Yes", and the procedure proceeds to Step S32.

When the GPS time information acquired by the second baseband circuit 85 and the time data calculated by the timekeeping circuit 93 are not consistent, the second baseband circuit 85 repeats the processing in Steps S30, S29, and S31. Therefore, when the GPS time information acquired by the second baseband circuit 85 and the time data calculated by the timekeeping circuit 93 are not consistent, the second baseband circuit 85 acquires GPS time information contained in sub frames in next six seconds.

Step S32 is a reception completion step. In this step, the second baseband circuit 85 completes the time measurement reception processing. Next, the process proceeds to Step S33.

Step S33 is a time correction step. When the satellite signals are received, the time information correction unit 96 corrects the time data calculated by the timekeeping circuit 93 using the acquired GPS time information. When the time information correction unit 96 corrects the time data, the display controller 97 corrects displays of the center second hand 18, the center minute hand 21, and the center hour hand 22 via the drive circuit 90 based on the corrected time data. Further, the display controller 97 performs a normal hand operation. Moreover, the display controller 97 moves the second sub pointer 32 to the position for displaying the battery residual amount. As described above, when the satellite signal waves are received, the time information correction unit 96 corrects time using the time information.

Then, the GPS time measurement reception start step in Step S12 is completed. When Step S12 is completed, the process subsequently proceeds to Step S1. In the GPS time measurement reception start step in Step S12, the GPS time information can be acquired during a reception time period from approximately five to 15 seconds. Further, in Step S12, one satellite is only required to be captured. Power consumption can be reduced, and reception at high sensitivity can be achieved.

The GPS receiver 83 receives satellite signals, and the time information correction unit 96 corrects time using the satellite signals. The satellite signals can be received outside a building on earth. Therefore, time can be corrected at any locations as long as the locations are outside a building.

Figure 19:
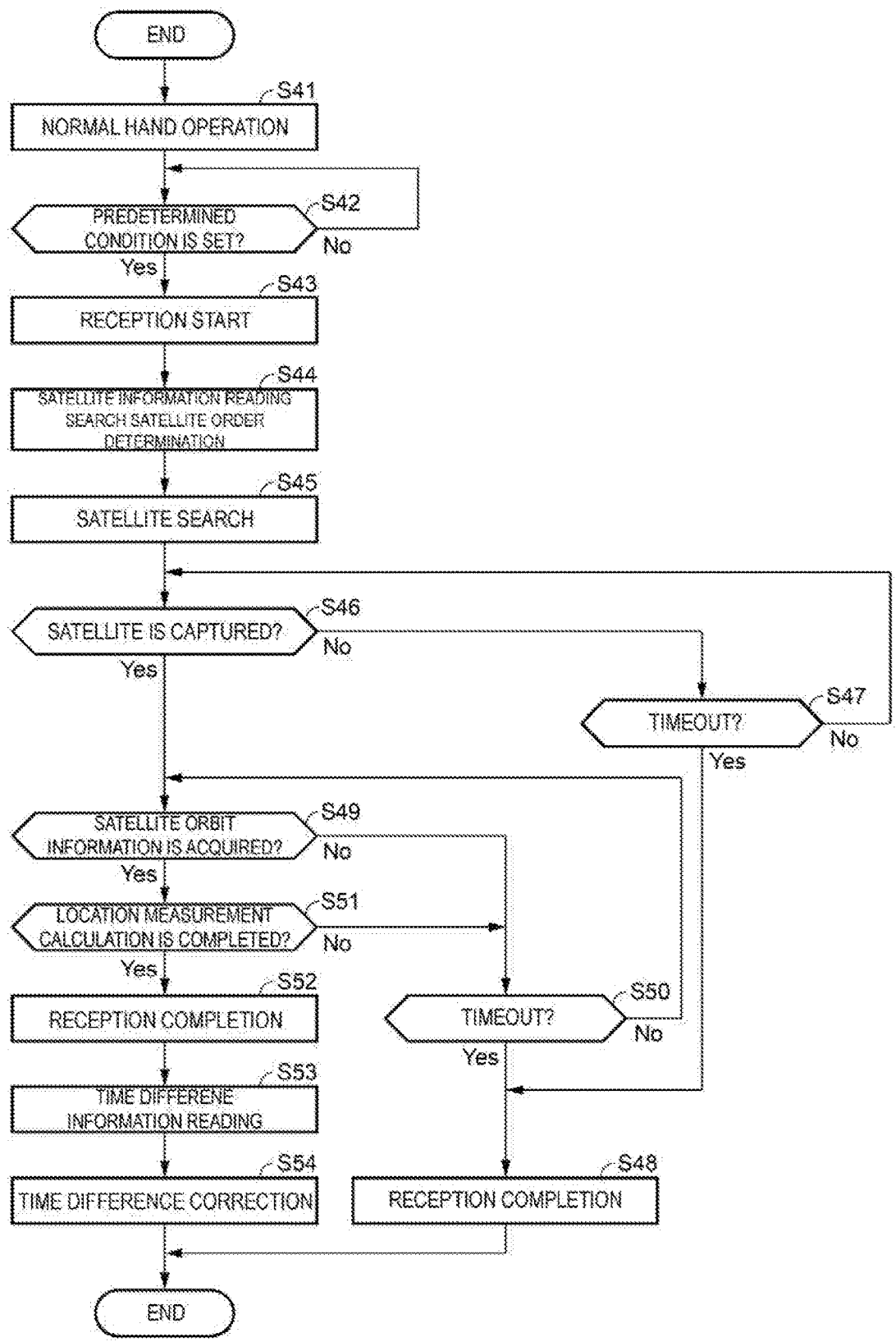
FIG. 19 is a flowchart of a second GPS location measurement reception start step.

FIG. 19 is a flowchart of the second GPS location measurement reception start step in Step S9. In FIG. 19, Step S41 is a normal hand operation step. In this step, the controller 89 performs a normal hand operation. Next, the process proceeds to Step S42.

Step S42 is a step of determining whether the predetermined conditions are satisfied. In Step S42, the same method as that in Step S22 is used to determine whether the predetermined conditions are satisfied. Step S42 is similar to Step S22, and hence description thereof is omitted.

When the location measurement reception controller 107 determines that the electronic watch 1 is located inside the building, the determination result is given as "No", and the procedure proceeds to Step S42. When the location measurement reception controller 107 determines that the electronic watch 1 is located outside the building, the determination result is given as "Yes", and the procedure proceeds to Step S43.

Step S43 is a reception start step. In this step, the location measurement reception controller 107 outputs a control signal to the GPS receiver 83 to start the location measurement reception processing. Next, the process proceeds to Step S44.

Step S44 is a satellite information reading and satellite searching step. In this step, the second baseband circuit 85 reads the satellite information of the artificial satellites 3, which are captured at the time of the previous reception, out from the second storage unit 87. Further, the second baseband circuit 85 sets the artificial satellites 3 captured previously as a top in a priority search order indicating an order of searching the artificial satellites 3. In this case, in the search order, at least four or more artificial satellites 3 are set.

The artificial satellite 3 orbits round the earth for approximately 12 hours, and the orbit is repeated at an approximately 24-hour cycle. Thus, the second baseband circuit 85 can roughly grasp the artificial satellite 3 that are easy to capture. Further, the second baseband circuit 85 determines a search order for the artificial satellites 3. In this case, the artificial satellites 3 that are easy to capture are set as a top in the search order, and thus the second baseband circuit 85 can efficiently capture satellite signals.

Step S45 is a satellite searching step. In this step, the GPS receiver 83 starts searching for satellite signals. Following the search order set in Step S44, the second baseband circuit 85 starts searching for the artificial satellites 3. Next, the process proceeds to Step S46.

Step S46 is a step of determining whether the satellites are captured. In this step, the same method as that in Step S25 is used to determine whether the second baseband circuit 85 captures the predetermined number or more of satellite signals required for location measurement. The predetermined number required for location measurement is three or more, normally, four.

More specifically, the second baseband circuit 85 determines whether orbit information and GPS time information are acquired. Note that, in the following, for simplification of the description, the determination is described as determination on whether the orbit information is acquired. Further, the second baseband circuit 85 transmits the determination result to the location measurement reception controller 107. When the second baseband circuit 85 cannot capture a satellite signal, the determination result is given as "No", and the procedure proceeds to Step S47. When the second baseband circuit 85 captures a satellite signal, the determination result is given as "Yes", and the procedure proceeds to Step S49.

Step S47 is a step of determining whether time-out is caused. In this step, the location measurement reception controller 107 compares an elapsed time period from the time when the location measurement starts and a determination time period. For example, the determination time period is set to 120 seconds. When the elapsed time period from the time when the location measurement starts falls within the determination time period, the location measurement reception controller 107 gives a determination result as "No", and the procedure proceeds to Step S46. When the elapsed time period from the time when the location measurement starts exceeds the determination time period, the location measurement reception controller 107 gives a determination result as "Yes", and the procedure proceeds to Step S48.

Step S48 is a reception completion step. In this step, the location measurement reception controller 107 completes the reception by the GPS receiver 83. Next, the process proceeds to Step S1.

Step S49 is a step of determining whether the satellite orbit information is acquired. In this step, it is determined whether the orbit information can be acquired from each of the captured artificial satellites 3. Specifically, it is determined whether the second baseband circuit 85 acquires the orbit information and the GPS time information from the satellite signals. Note that, in the following, for simplification of the description, the determination is described as determination on whether the orbit information is acquired. When the second baseband circuit 85 cannot acquire a satellite orbit, the determination result is given as "No", and the procedure proceeds to Step S50. When the second baseband circuit 85 acquires a satellite orbit, the determination result is given as "Yes", and the procedure proceeds to Step S51.

Step S50 is a step of determining whether time-out is caused. In this step, the location measurement reception controller 107 compares an elapsed time period from the completion of Step S46 and a determination time. For example, the determination time period is set to 120 seconds. When the elapsed time period from the completion of Step S46 falls within the determination time period, the location measurement reception controller 107 gives a determination result as "No", and the procedure proceeds to Step S49. When the elapsed time period from the completion of Step S46 exceeds the determination time period, the location measurement reception controller 107 gives a determination result as "Yes", and the procedure proceeds to Step S48.

Step S51 is a step of determining whether the location measurement calculation is completed. In this step, the second baseband circuit 85 executes location measurement calculation using the orbit information and the GPS time information. Further, the second baseband circuit 85 determines whether the location measurement calculation is completed. When the location measurement calculation is not completed, the second baseband circuit 85 gives a determination result as "No", and the procedure proceeds to Step S50. When the location measurement calculation is completed, the second baseband circuit 85 gives a determination result as "Yes", and the procedure proceeds to Step S52.

Step S52 is a reception completion step. In this step, the second baseband circuit 85 completes the reception of the satellite signals. Next, the process proceeds to Step S53.

Step S53 is a step of a time difference information reading step. In this step, the time information correction unit 96 inputs a result of the location measurement calculation from the second baseband circuit 85. The result of the location measurement calculation contains latitude information and longitude information. Further, the time information correction unit 96 inputs time difference information corresponding to the latitude information and the longitude information from the first storage unit 92. Next, the process proceeds to Step S54.

Step S54 is a time difference correction step. In this step, the time information correction unit 96 corrects the time data using the time difference information. Next, the display controller 97 corrects displays of the center second hand 18, the center minute hand 21, and the center hour hand 22 via the drive circuit 90 based on the time data after correction. With the processing described above, the time difference correction is performed. Further, the display controller 97 performs a normal hand operation. Moreover, the display controller 97 moves the second sub pointer 32 to the position for displaying the battery residual amount. Now, the second GPS location measurement reception start step in Step S9 is completed. Next, the process proceeds to Step S1.

FIG. 20 is a flowchart of the GPS location measurement reception stop and BLE communication start step in Step S10. In FIG. 20, Step S61 is a step of displaying a state of receiving. In this step, the second sub pointer 32 is moved to a position to display that the display controller 97 is in a receiving state of near field communication. The position at which "BLE" is displayed is provided on the dial 16, this position displays a receiving state of near field communication. Next, the process proceeds to Step S62.

Step S62 is a BLE scanning start step. In this step, the satellite signal reception controller 101 stops the GPS receiver 83. Further, the near field communication controller 102 drives the beacon receiver 88 to scan a beacon signal transmitted from the beacon 4. As described above, when the second button 14*b* accepts a reception instruction of a beacon signal containing beacon identification information in Step S5, the beacon receiver 88 receives a beacon signal. Next, the process proceeds to Step S63.

Step S63 is a step of determining whether a beacon ID is received. In this step, the first signal controller 132 determines whether the first baseband circuit 131 receives a UUID contained in the beacon signal. When the first baseband circuit 131 cannot receive the UUID, the first signal controller 132 gives a determination result as "No", and the procedure proceeds to Step S64. When the first baseband circuit 131 receives the UUID, the first signal controller 132 gives a determination result as "Yes", and the procedure proceeds to Step S65.

Step S64 is a step of determining whether time-out is caused. In this step, the near field communication controller 102 compares an elapsed time period from the start of Step S62 and a determination time period. For example, the determination time period is set to 60 seconds. When the elapsed time period from the start of Step S62 falls within the determination time period, the near field communication controller 102 gives a determination result as "No", and the procedure proceeds to Step S63. When the elapsed time period from the start of Step S62 exceeds the determination time, the near field communication controller 102 gives a determination result as "Yes", and the procedure proceeds to Step S70.

Step S65 is a beacon information reading step. In this step, the time information correction unit 96 inputs the UUID from the beacon receiver 88. Further, the time information correction unit 96 searches for the time difference information corresponding to the UUID from the first storage unit 92. Next, the process proceeds to Step S66.

Step S66 is a step of determining presence or absence of an ID that matches. In this step, the time information correction unit 96 determines whether a UUID, which matches with the UUID contained in the beacon signal from the beacon receiver 88, is present in the first storage unit 92. When the UUID that matches is not present in the first storage unit 92, the time information correction unit 96 gives a determination result as "No", and the procedure proceeds to Step S70. When the UUID that matches is present in the first storage unit 92, the time information correction unit 96 gives a determination result as "Yes". Further, the time information correction unit 96 inputs the time difference information corresponding to the UUID from the first storage unit 92. Next, the process proceeds to Step S67.

Step S67 is a communication completion step. In this step, the beacon receiver 88 completes the reception of the beacon signal. Next, the process proceeds to Step S68.

Step S68 is a step of updating a history record on ID detection. In this step, the UUID of the beacon signal received by the beacon receiver 88 is stored in the second storage unit 87. The UUID data on the beacon signals received in the past is stored in the second storage unit 87. The beacons signals of the UUIDs received in the past are highly likely to be received again. When the information stored in the second storage unit 87 is organized, the history record can be utilized.

Step S69 is a hand operation fast-forwarding and time correction step. In this step, the time information correction unit 96 corrects the time data using the time difference information. Next, the display controller 97 corrects displays by fast-forwarding the center second hand 18, the center minute hand 21, and the center hour hand 22 via the drive circuit 90 based on the time data after correction. As described above, when the beacon signal is received, the time information correction unit 96 corrects time based on the UUID contained in the beacon signal using the time difference information stored in the first storage unit 92. Next, the process proceeds to Step S70.

Step S70 is a step of hiding display of a state of receiving. In this step, the display controller 97 moves the second sub pointer 32 from the position at which "BLE" is displayed to the position displaying the battery residual amount. Next, the process proceeds to Step S71.

Step S71 is a normal hand operation step. In this step, the controller 89 performs a normal hand operation. Now, the GPS location measurement reception stop and BLE communication start step in Step S10 is completed. Next, the process proceeds to Step S1.

As described above, according to the present exemplary embodiment, the following advantages are achieved.

(1) According to the present exemplary embodiment, in the electronic watch 1, the GPS receiver 83 receives satellite signals. Further, using the satellite signals, the first time correction unit 104 corrects time. Therefore, when the satellite signals can be received, time can be corrected at high accuracy.

Moreover, the beacon receiver 88 receives a beacon signal. The first storage unit 92 stores the UUIDs and the time difference information corresponding to the UUIDs. Further, the second time correction unit 105 corrects a time difference using the beacon signal and the time difference information. Therefore, when the beacon signal can be received, a time difference can be corrected.

When the buttons 14 accept a reception instruction of a beacon signal, the beacon receiver 88 receives a beacon signal. When arriving at a space indoors such as the airport 7 after a long-distance travel by the airplane 6 or the like, intensity of a radio wave of satellite signal is weak inside the airport 7, and hence the satellite signal is hard to receive. In this case, the operator 5 gives a reception instruction of a beacon signal by operating the buttons 14, and causes the electronic watch 1 to correct a time difference. The operator 5 is aware of specific locations in advance, such as the airport 7 at which the operator 5 is expected to perform time correction. Therefore, the electronic watch is only required to store, in the first storage unit 92, the UUIDs of the specific locations and the time difference information corresponding to the UUIDs.

When the first storage unit 92 stores UUIDs installed at locations at which the operator 5 is less likely to give a reception instruction and time difference information corresponding to the UUIDs, an enormous storage capacity is required for the first storage unit 92. In the present electronic watch 1, the operator 5 gives a reception instruction of a beacon signal, and hence the first storage unit 92 is only required to store the UUIDs installed at the locations at which the operator 5 is highly likely to give a reception instruction and the time difference information corresponding to the UUIDs. Therefore, the electronic watch 1 can correct a time difference even with a limited storage capacity of the first storage unit 92.

(2) According to the present exemplary embodiment, the GPS receiver 83 receives a plurality of satellite signals. Further, when the GPS receiver 83 can receive a plurality of satellite signals, the location measurement reception controller 107 calculates a reception location. When the GPS receiver 83 cannot receive a plurality of satellite signals in Step S8, the GPS receiver 83 is stopped in Step S10. Next, the beacon receiver 88 receives a beacon signal. Further, the time information correction unit 96 corrects time. As described above, the GPS receiver 83 and the beacon receiver 88 are not operated in parallel, and hence a peak of power consumption can be lowered.

(3) According to the present exemplary embodiment, the GPS receiver 83 receives satellite signals. The satellite signals can be received outside a building on earth. Therefore, time can be corrected at high accuracy at any locations as long as the locations are outside a building.

(4) According to the present exemplary embodiment, the first storage unit 92 includes a re-writable nonvolatile memory. The nonvolatile memory can maintain storage without power consumption. Further, the first storage unit 92 is re-writable, and hence a UUID of a beacon to be used can be changed.

(5) In the method of correcting time and a time difference according to the present exemplary embodiment, satellite signals containing time information are received. Further, time is corrected using the time information. Therefore, when the satellite signals can be received, time is corrected at high accuracy.

Moreover, when the operator 5 operates the buttons 14 to perform an operation of giving a reception instruction of a beacon, the buttons 14 accept an operation of a reception instruction of a beacon signal. Further, a beacon signal is received. The beacon signal contains a UUID. The first storage unit 92 stores the UUIDs and the time difference information corresponding to the UUIDs. Further, the time information correction unit 96 corrects time using the beacon signal and the time difference information. Therefore, when the beacon signal can be received, a time difference can be corrected.

When arriving at a space indoors such as the airport 7 after a long-distance travel by the airplane 6 or the like, intensity of a radio wave of satellite signal is weak inside the airport 7, and hence the satellite signal is hard to receive. In this case, the operator 5 gives a reception instruction of a beacon signal by operating the buttons 14, and causes the electronic watch 1 to correct time. The operator 5 is aware of specific locations in advance, such as the airport at which time correction is expected to be performed. Therefore, when the first storage unit 92 stores the UUIDs and the time difference information corresponding to the UUIDs, the operator 5 can correct a time difference.

When the first storage unit 92 stores UUIDs installed at locations at which the operator 5 is less likely to give a reception instruction and time difference information corresponding to the UUIDs, an enormous storage capacity is required for the first storage unit 92. In the electronic watch 1, the operator 5 gives a reception instruction of a beacon signal, and hence the first storage unit 92 is only required to store the UUIDs installed at the locations at which the operator 5 is highly likely to give a reception instruction and the time difference information corresponding to the UUIDs. Therefore, the electronic watch 1 can correct a time difference using the beacon signal even with a limited storage capacity of the first storage unit 92.

(6) According to the present exemplary embodiment, the beacon receiver 88 receives a beacon signal, but does not establish a BLE link. Therefore, the beacon receiver 88 is not required to perform authentication for communication with the beacon 4, and hence the communication processing can be executed in a short time period. Further, the communication processing can be executed in a short time period, and hence the electronic watch 1 can suppress power consumption.

Second Exemplary Embodiment

Next, an electronic watch according to an exemplary embodiment is described with reference to FIG. 21 to FIG. 24. The present exemplary embodiment is different from the first exemplary embodiment in that a standard radio wave is used in place of a satellite signal. Note that the matters similar to those in the first exemplary embodiment are omitted in description.

Figure 21:
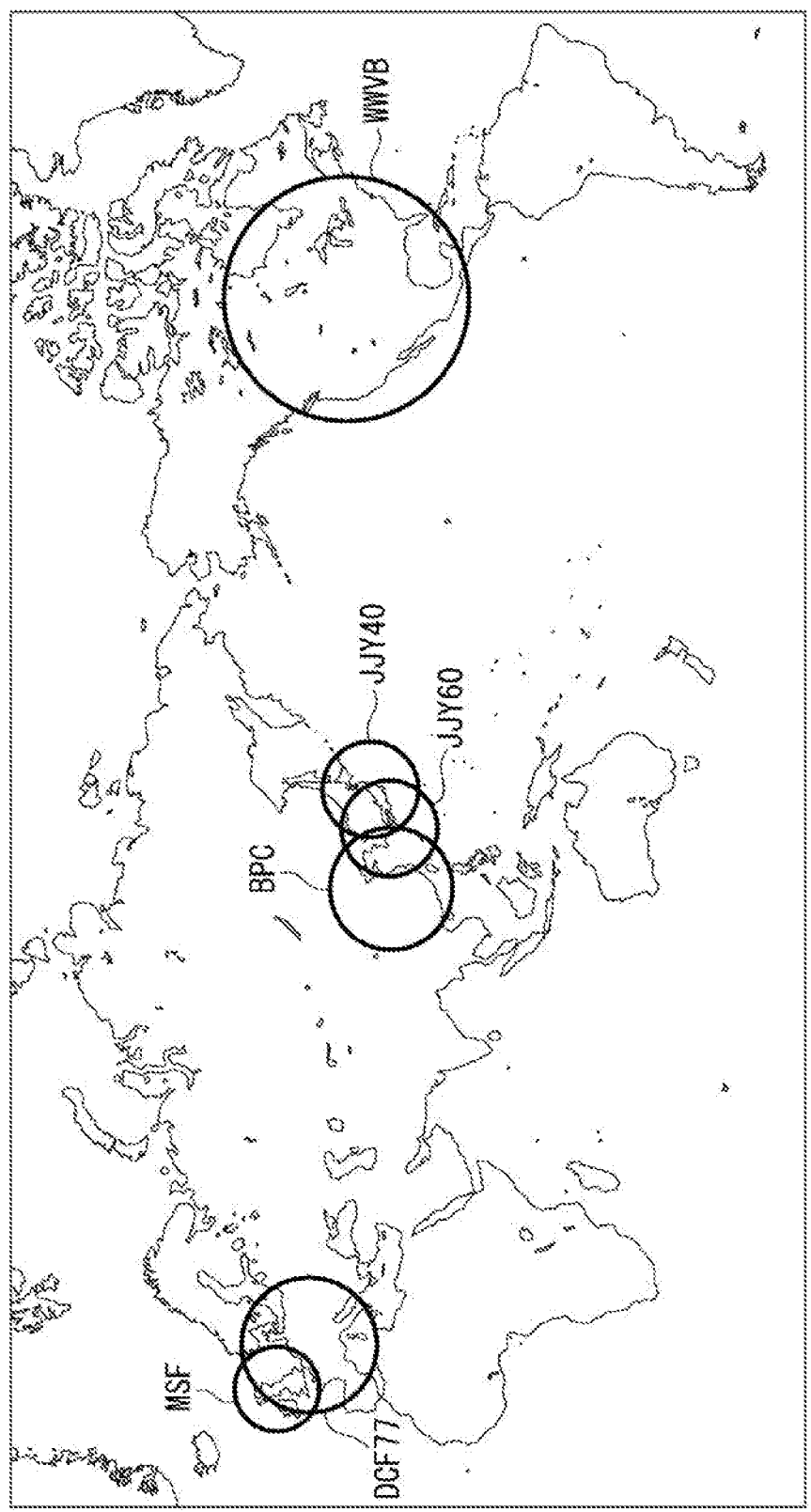
FIG. 21 is a view illustrating a reception area of a standard radio wave signal in a second exemplary embodiment.

FIG. 21 is a view illustrating reception areas of a standard radio wave signal. As illustrated in FIG. 21, the standard radio wave can be received only in specific areas in the world. The areas where the standard radio wave can be received are given names such as JJY40, JJY60, BPC, WWVB, MSF, and DCF77. JJY40 and JJY60 are areas with Japan as the center. BPC is an area with China as the center. WWVB is an area with the USA as the center. MSF is an area with UK as the center. DCF77 is an area with Germany as the center. The standard radio wave is a low-frequency signal with reception signal intensity approximately 100 times as strong as that of a GPS satellite signal. Therefore, the standard radio wave is a radio wave easier to receive than the GPS satellite signal. Further, reception of the standard radio wave can be performed with less power than reception of the GPS satellite signal.

Figure 22:
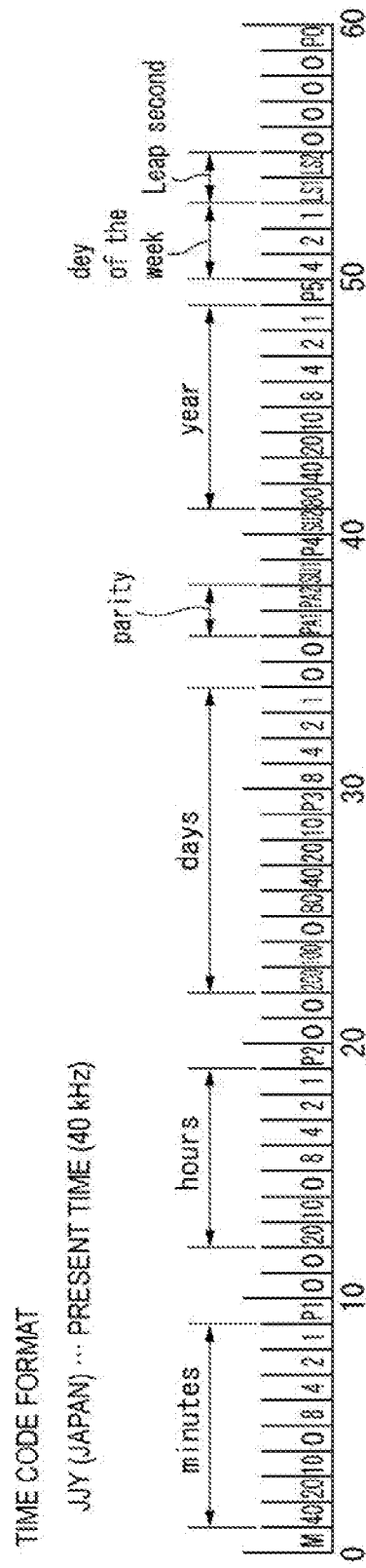
FIG. 22 is a view illustrating a time code format of JJY.

FIG. 22 is a view illustrating a time code format of JJY. Time information contained in a long-wavelength standard radio wave signal is generated in conformity with a predetermined time information format for each country. The time information is also referred to as a time code, and the time information format is also referred to as a time code format.

As illustrated in FIG. 22, in a time code format of JJY40 and JJY60, one signal is transmitted every second, and one record is constituted of 60 seconds. One record is also referred to as one frame. That is, one frame is data with 60 bits. Further, as data items, a minute and an hour at present time, the total number of days from January 1 of a present year, a year, a day, "leap seconds", and the like are contained. A year is indicated by data with two digits of the year. A value of each item is obtained with a combination of numbers allocated to each bit. The combination indicating the numerical value is determined based on the type of the signal.

Between a bit stream of the total number of days and a bit stream of the year, a first parity bit PA1 corresponding to the hour and a second parity bit PA2 corresponding to the minute are set. In the drawing, the first parity bit is indicated with "PA1". In the drawing, the second parity bit is indicated with "PA2".

In the drawing, a marker corresponding to a normal minute is indicated with "M". The normal minute indicates a zero second of each minute. "P1 to P5" indicate position markers. The position markers are signals at positions fixed in advance. In each item, a signal indicating "1" is a signal with a pulse width of approximately 0.5 seconds. A signal indicating "0" is a signal with a pulse width of approximately 0.8 seconds. A signal "P" indicating each marker is a signal with a pulse width of approximately 0.2 seconds. A time code format of the standard radio wave signal and a pulse width of each signal are set in accordance with a type of a long-wavelength standard radio wave signal.

Figure 23:
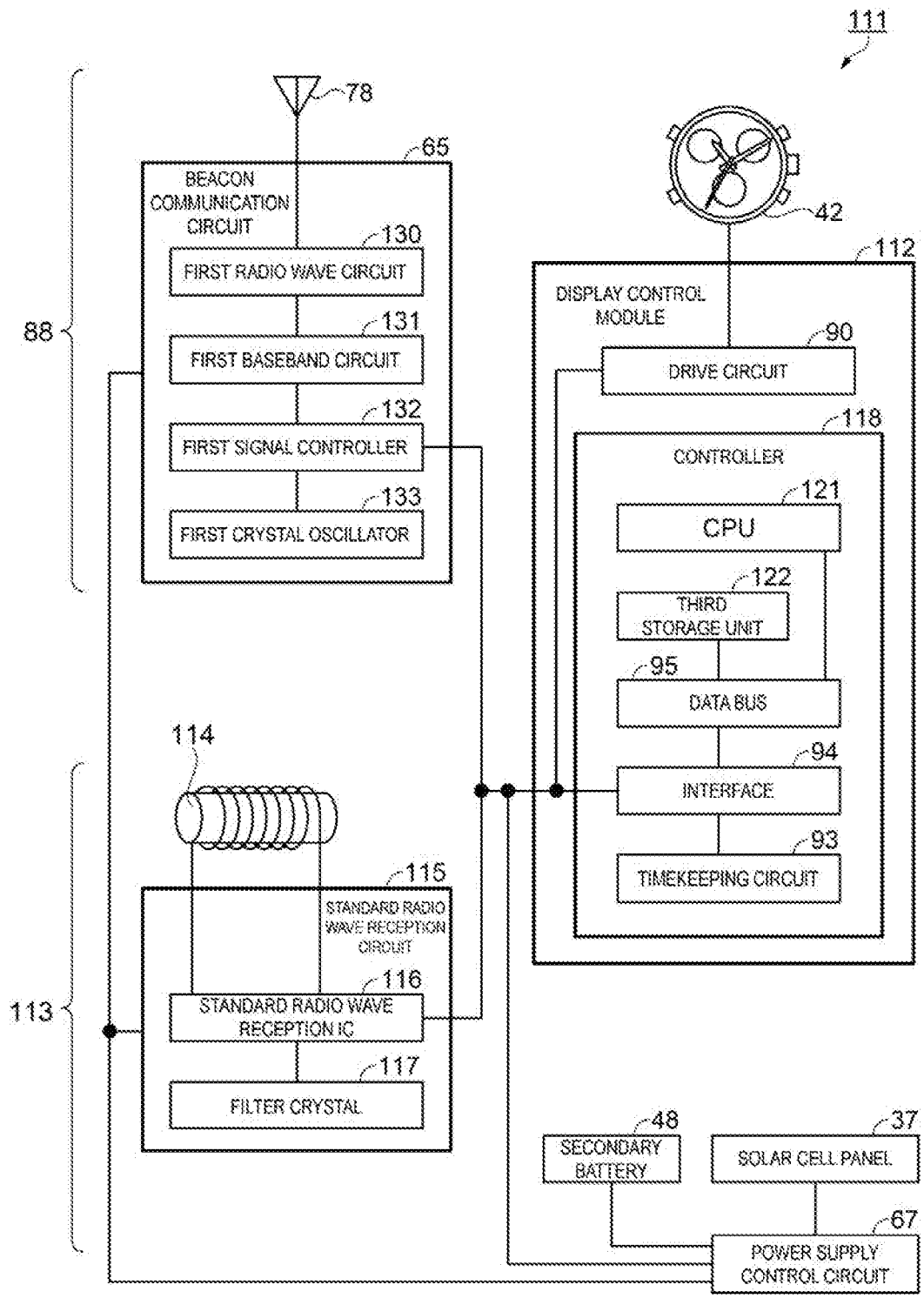
FIG. 23 is a block diagram illustrating a circuit configuration of the electronic watch.

FIG. 23 is a block diagram illustrating a circuit configuration of the electronic watch. An electronic watch 111 includes a display control module 112, the beacon receiver 88, a standard radio wave receiver 113 and the power source control circuit 67 being a first receiver, and the like. The beacon receiver 88 and the power source control circuit 67 are the same circuits as those in the first exemplary embodiment. The beacon receiver 88 receives a beacon signal containing beacon identification information transmitted from the beacon 4 installed indoors. Similarly to the first exemplary embodiment, the operation device is constituted of the reception mode controller 100 and the crown 13 and the buttons 14. Further, the operation device accepts an instruction of receiving a beacon signal, which is given by the operator 5.

The standard radio wave receiver 113 includes the bar antenna 114 and a standard radio wave reception circuit 115. The bar antenna 114 receives a long-wavelength standard radio wave. Hereinafter, the long-wavelength standard radio wave is referred to as a "standard radio wave" or a "standard radio wave signal". The bar antenna 114 outputs the received standard radio wave to the standard radio wave reception circuit 115. The standard radio wave reception circuit 115 demodulates a reception signal of the standard radio wave received by the bar antenna 114, and outputs the signal as a time code output signal to the display control module 112. A time code output is also referred to as a Time Code Out (TCO) signal.

The standard radio wave reception circuit 115 is a general circuit that receives a standard radio wave. The standard radio wave reception circuit 115 includes a standard radio wave reception IC 116 and a filter crystal 117. The standard radio wave reception IC 116 includes a tuned circuit, an amplifier circuit, a mixer circuit, an intermediate frequency amplifier circuit, an envelope detection circuit, an automatic gain control circuit, a binary circuit, a phase locked loop (PLL) circuit, and a Voltage Controlled Oscillator (VCO). The filter crystal 117 is used for the intermediate frequency amplifier circuit. The automatic gain control circuit is also referred to as an AutoGain Control (AGC) circuit.

The tuned circuit includes a capacitor. The tuned circuit and the bar antenna 114 constitute a parallel resonant circuit. the tuned circuit selects and receives one among standard radio waves of "JJY40", "JJY60", "WWVB", "DCF77", "MSF", and "BPC". The tuned circuit outputs a reception signal to the amplifier circuit.

The amplifier circuit amplifies the reception signal input from the tuned circuit to have a certain amplitude, and outputs the signal to the mixer circuit. The mixer circuit input the amplified reception signal and a signal output from the VCO, and mixes the signals. Further, the mixer circuit down-converts the amplified reception signal into an intermediate-frequency signal, and outputs the signal to the intermediate frequency amplifier circuit. The intermediate frequency amplifier circuit further amplifies the reception signal input from the mixer circuit, and outputs the signal to the envelope detection circuit. The envelope detection circuit includes a rectifier and a low-pass filter. The envelope detection circuit rectifies the input reception signal, and extracts a low-frequency component. With this, an envelope signal is obtained. The envelope detection circuit outputs the envelope signal to the automatic gain control circuit and the binary circuit.

The automatic gain control circuit outputs, to the amplifier circuit, a signal for determining a gain at the time when the amplifier circuit amplifies the reception signal based on the envelope signal. The amplifier circuit adjusts the gain in accordance with the signal input from the automatic gain control circuit. The binary circuit compares the envelope signal and a reference voltage, and generates a binary signal. This binary signal is a time code output signal. Further, the binary circuit outputs the time code output signal to the display control module 112. The time code output signal contains time information of the standard radio wave. As described above, the standard radio wave receiver 113 receives a standard radio wave containing time information.

The display control module 112 includes a controller 118. The controller 118 includes a CPU 121, a third storage unit 122 being a storage unit, the timekeeping circuit 93, the input/output interface 94, the data bus 95, and the like. The third storage unit 122 is formed of a nonvolatile memory similarly to the first storage unit 92 in the first exemplary embodiment. Various programs executed by the controller 118 are stored in the third storage unit 122. In addition, the third storage unit 122 stores a time code output signal output from the standard radio wave receiver 113. The third storage unit 122 stores the predetermined beacon identification information output from the beacon communication circuit 65 and the time difference information corresponding to the beacon identification information.

Figure 24:
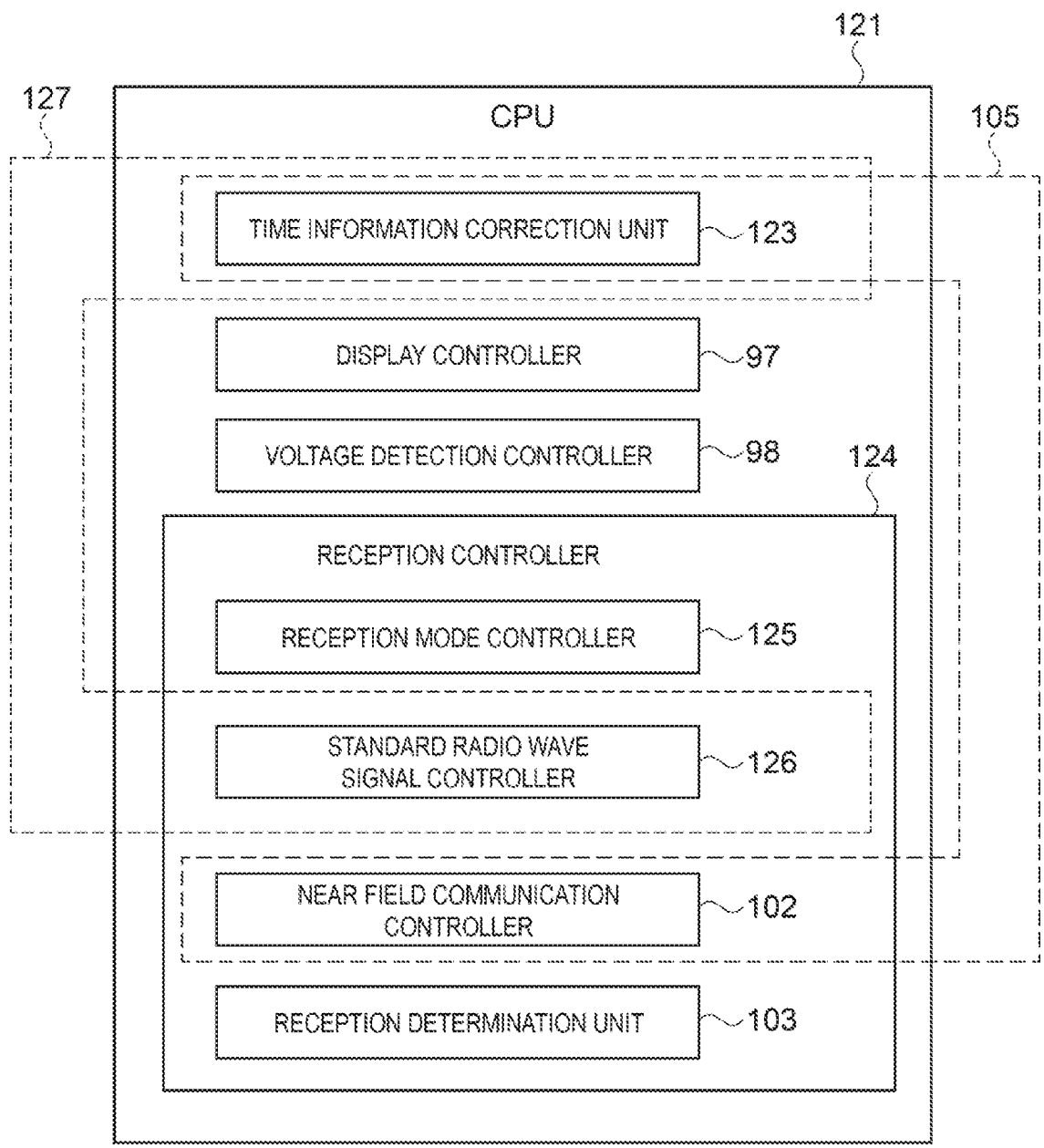
FIG. 24 is a block diagram illustrating a configuration of a function of a CPU.

FIG. 24 is a block diagram illustrating a configuration of a function of the CPU. The CPU 121 has a function achieved by executing the programs stored in the third storage unit 122. As illustrated in FIG. 24, the function of the CPU 121 includes a time information correction unit 123 being a first time correction unit and a second time correction unit. The time information correction unit 123 corrects time using the time code output signal received by the standard radio wave receiver 113. In addition, the time information correction unit 123 corrects time using the beacon signal received by the beacon receiver 88 and the time difference information stored in the third storage unit 122.

In addition, the function of the CPU 121 includes the display controller 97 and the voltage detection controller 98. The function of the display controller 97 and the voltage detection controller 98 are the same as that in the first exemplary embodiment, and description thereof is omitted.

In addition, the function of the CPU 121 includes a reception controller 124. The reception controller 124 includes a reception mode controller 125, a standard radio wave signal controller 126, the near field communication controller 102, and the reception determination unit 103. Further, the first time correction unit 127 is constituted of the time information correction unit 123 and the standard radio wave signal controller 126. The first time correction unit 127 corrects time using the time information of the standard radio wave received by the standard radio wave receiver 113.

Moreover, the second time correction unit 105 is constituted of the time information correction unit 123 and the near field communication controller 102. The second time correction unit 105 corrects time using the beacon signal received by the beacon receiver 88 and the time difference information stored in the third storage unit 122.

The reception mode controller 125 detects predetermined operations of the crown 13 and the buttons 14, and controls execution of various types of the reception processing. The operation device is constituted of the reception mode controller 125 and the crown 13 and the buttons 14. Further, the operation device accepts an instruction of receiving a beacon signal, which is given by the operator 5. In addition, the operation device accepts an instruction of receiving a standard radio wave, which is given by the operator 5.

The standard radio wave signal controller 126 activates the standard radio wave receiver 113. Further, the standard radio wave signal controller 126 inputs the time code output signal from the standard radio wave receiver 113. The standard radio wave signal controller 126 extracts the time information from the time code output signal, and outputs the information to the time information correction unit 123. Using the time information, the time information correction unit 123 corrects the time data calculated by the timekeeping circuit 93.

Similarly to the first exemplary embodiment, the near field communication controller 102 and the time information correction unit 123 correct time using the beacon signal received by the beacon receiver 88 and the time difference information stored in the third storage unit 122. Detailed description for the near field communication controller 102 and the time information correction unit 123 is omitted.

The reception determination unit 103 has a function of determining whether reception of the standard radio wave and correction of the time data are successfully completed. For example, the reception determination unit 103 compares the time information acquired from the received standard radio wave and the time data calculated by the timekeeping circuit 93. When a difference between the time information of the standard radio wave and the time data of the timekeeping circuit 93 is large, processing for preventing erroneous correction is executed.

In the processing for preventing erroneous correction, the standard radio wave receiver 113 receives a standard radio wave again, and acquires time information again. Further, the reception determination unit 103 compares the acquired time information of the standard radio wave and the time data of the timekeeping circuit 93. Further, when the difference between the time information of the standard radio wave and the time data of the timekeeping circuit 93 is small, the time information correction unit 123 performs time correction.

Figure 25:
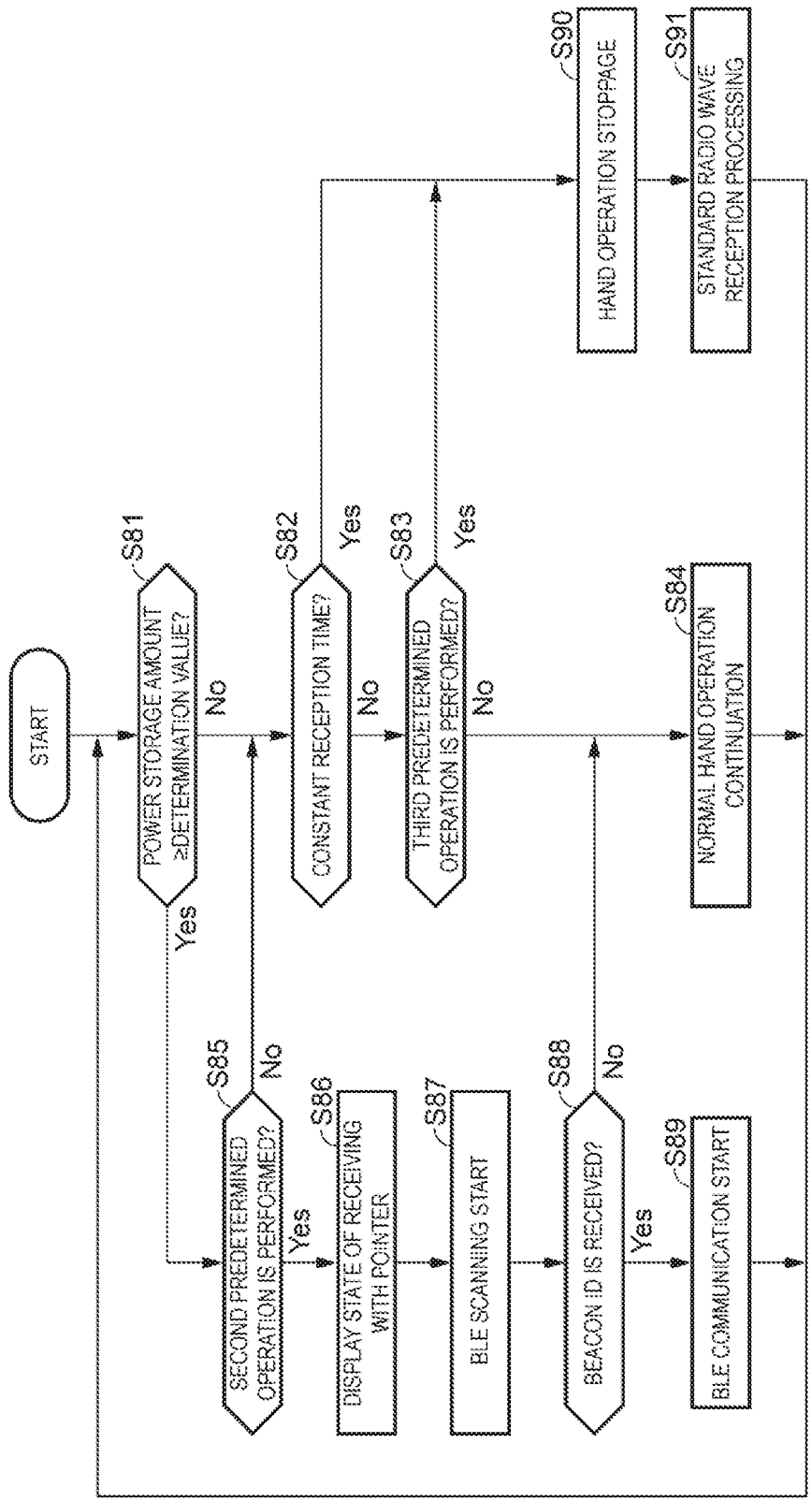
FIG. 25 is a flowchart of a method of correcting time and a time difference.
Figure 26:
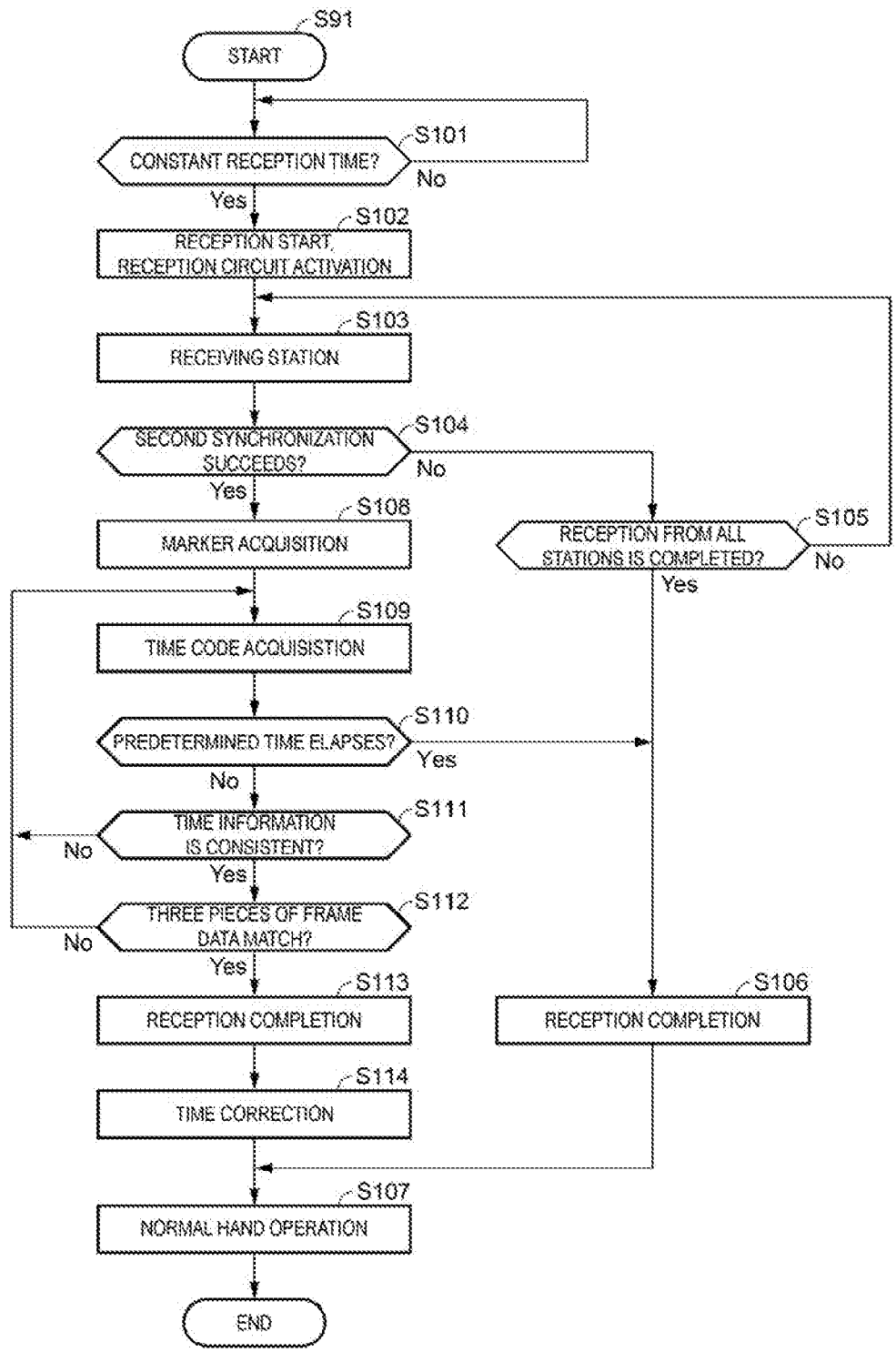
FIG. 26 is a flowchart illustrating standard radio wave reception processing.

Next, a method of correcting time and a time difference of the electronic watch 111 described above is described with reference to FIG. 25 and FIG. 26. The method of correcting time and a time difference is performed in the electronic watch 111. Each of FIG. 25 and FIG. 26 is a flowchart of a method of correcting time and a time difference. In the flowchart of FIG. 25, Step S81 is a step of determining whether a power storage amount is equal to or more than a determination value. In Step S81, the power source control circuit 67 detects a power storage amount in the secondary battery 48 at a 60-second interval. The power storage amount of the secondary battery 48 and a voltage of the secondary battery 48 are mutually related, and hence the power source control circuit 67 detects the power storage amount by measuring the voltage of the secondary battery 48. Further, the voltage detection controller 98 compares the power storage amount of the secondary battery 48 with a first determination value.

As the first determination value, such power storage amount is set that system-down of the controller 118 is avoided even when the standard radio wave receiver 113 executes reception processing of a standard radio wave. In the present exemplary embodiment, for example, the power storage amount of the first determination value is 3.6 V when converted into a voltage. When the power storage amount is equal to or more than the first determination value, the voltage detection controller gives a determination result as "Yes", and the procedure proceeds to Step S85. When the power storage amount is less than the first determination value, the voltage detection controller 98 gives a determination result as "No", and the procedure proceeds to Step S82.

Step S82 is a step of determining whether constant reception time arrives. The standard radio wave signal controller 126 determines whether the time data of the time measured by the timekeeping circuit 93 matches with the standard radio wave constant reception time that is set in advance. The standard radio wave constant reception time is set at 2 AM, 4 AM, or the like being a time hour with less noise. Further, the standard radio wave constant reception time may be set at plurality of times, for example, at 2 AM, 3 AM, and 4 AM. In this case, when the reception processing fails at 2 AM, the reception processing is only required to be executed at 3 AM. When the reception processing also fails at 3 AM, the reception processing is only required to be executed at 4 AM.

When the time data does not match with the constant reception time for a standard radio wave, the standard radio wave signal controller 126 gives a determination result as "No", and the procedure proceeds to Step S83. Meanwhile, when the time data matches with the constant reception time, the standard radio wave signal controller 126 gives a determination result as "Yes", and the procedure proceeds to Step S90.

Step S83 is a step of determining whether a third predetermined operation. The third predetermined operation is an operation of pressing the third button 14c. When the operator 5 presses the third button 14c, the drive circuit 90 detects that the third button 14c is pressed. Further, the drive circuit 90 outputs a signal indicating pressing of the third button 14c to the CPU 121. The third button 14c is a button for accepting a reception instruction of a standard radio wave.

When the CPU 121 inputs the signal indicating pressing of the third button 14c, the CPU 121 gives a determination result for presence of the third predetermined operation as "Yes", and the procedure proceeds to Step S90. When the CPU 121 does not input the signal indicating pressing of the third button 14c, the CPU 121 gives a determination result for presence of the third predetermined operation as "No", and the procedure proceeds to Step S84.

Step S84 is a normal hand operation continuation step. In this step, the controller 118 continues a normal hand operation. Next, the process proceeds to Step S81. Further, the controller 118 repeatedly executes processing in Step S81 to Step S84 at a predetermined time interval.

Step S85 is a step of determining whether the second predetermined operation. The second predetermined operation is an operation of pressing the second button 14b. When the operator 5 presses the second button 14b, the drive circuit 90 detects that the second button 14b is pressed. Further, the drive circuit 90 outputs a signal indicating pressing of the second button 14b to the CPU 121.

The second button 14b is a button for canceling a "flight mode". The "flight mode" is a mode indicating that the electronic watch 111 is located inside an airplane. The operator 5 operates the second button 14b when stepping out of the airplane. When the "flight mode" is canceled, the beacon receiver 88 execute processing of receiving a beacon signal. Thus, the second button 14b functions as an operation device that performs a reception instruction of a beacon signal.

When the CPU 121 inputs the signal indicating pressing of the second button 14b, the CPU 121 gives a determination result for presence of the second predetermined operation as "Yes", and the procedure proceeds to Step S86. When the CPU 121 does not input the signal indicating pressing of the second button 14b, the CPU 121 gives a determination result for presence of the second predetermined operation as "No", and the procedure proceeds to Step S82.

Step S86 is a step of display a state of receiving with the pointer. In this step, the second sub pointer 32 is moved to a position to display that the display controller 97 is in a receiving state of near field communication. The position at which "BLE" is displayed is provided on the dial 16, this position displays a receiving state of near field communication. Next, the process proceeds to Step S87.

Step S87 is a BLE scanning start step. In this step, the near field communication controller 102 drives the beacon receiver 88 to scan a beacon signal transmitted from the beacon 4. As described above, when the second button 14b accepts a reception instruction of a beacon signal containing beacon identification information in Step S85, the beacon receiver 88 receives a beacon signal. Next, the process proceeds to Step S88.

Step S88 is a step of determining whether a beacon ID is received. In this step, the first signal controller 132 determines whether the beacon receiver 88 receives a UUID contained in the beacon signal. When the beacon receiver 88 cannot receive a UUID, the determination result is given as "No", and the procedure proceeds to Step S84. When the beacon receiver 88 receives a UUID, the determination result is given as "Yes", and the procedure proceeds to Step S89.

Step S89 is a BLE communication start step. In this step, time correction is performed using a beacon signal. In this step, Step S65 to Step S70 in the first exemplary embodiment are performed. After that, the process proceeds to Step S81.

Step S90 is a hand operation stoppage step. In this step, the display controller 97 outputs an instruction signal to the drive circuit 90 to stop hand operations of the center second hand 18, the center minute hand 21, the center hour hand 22, and the like. Further, noise generated at the time of driving the stepping motors of the drive mechanism 42 is prevented from disadvantageously affecting reception of a standard radio wave. Next, the process proceeds to Step S91.

Step S91 is a standard radio wave reception processing step. In this step, the time data is corrected by executing standard radio wave reception processing. Next, the process proceeds to Step S81.

FIG. 26 is a flowchart illustrating the standard radio wave reception processing and illustrating Step S91 in detail. S101 in FIG. 26 is a step of determining whether constant reception time arrives. It is determined that the constant reception time arrives in Step S82, and hence, in general, the constant reception time also arrives in Step S101. Note that in the present exemplary embodiment, it is determined whether the constant reception time for a standard radio wave arrives in Step S82 and Step S101. However, the determination may be performed only in Step S82, and the determination processing in Step S101 may be omitted.

When the time data does not match with the constant reception time for a standard radio wave, the standard radio wave signal controller 126 gives a determination result as "No", and the procedure proceeds to Step S101. Meanwhile, when the time data matches with the constant reception time, the standard radio wave signal controller 126 gives a determination result as "Yes", and the procedure proceeds to Step S102.

Step S102 is a reception start and reception circuit activation step. In this step, the standard radio wave signal controller 126 activates the standard radio wave reception circuit 115. Further, the standard radio wave reception circuit 115 starts reception processing of a standard radio wave. Next, the process proceeds to Step S103.

Step S103 is a receiving-station selection step. In this step, the standard radio wave signal controller 126 selects a receiving station. Further, a type of the standard radio wave to be received is determined. When the previous reception processing succeeds, the previous receiving station is set. Next, the process proceeds to Step S104.

Step S104 is a step of determining whether second synchronization succeeds. In this step, the standard radio wave signal controller 126 executes second synchronization processing based on the time code output signal output from the binary circuit. The standard radio wave is a signal changing every second. In the second synchronization processing, it is confirmed whether a rising timing of the time code output signal is at a one-second interval. When the rising timing of the time code output signal is at a one-second interval, the communication is established appropriately. When the rising timing of the time code output signal is at a one-second interval, the standard radio wave signal controller 126 gives a determination result as "Yes", and the procedure proceeds to Step S108. When the rising timing of the time code output signal is not at a one-second interval even after a predetermined elapsed time period, the standard radio wave signal controller 126 gives a determination result as "No", and the procedure proceeds to Step S105.

Step S105 is a step of determining whether reception from all the stations is completed. In this step, the standard radio wave signal controller 126 determines whether the standard radio wave receiver 113 completes reception from all the stations. "All the stations" may include all standard radio waves that are receivable by the electronic watch 111. For example, when JJY40, JJY60, WWVB, BPC, DCF77, and MSF are set receivable, all the stations for those may be targeted. In addition, only a station designated by the operator 5 may be targeted. For example, when the electronic watch 111 is located in London, two stations that are MSF and DCF77 may be targeted. When there is a station from which the standard radio wave receiver 113 does not perform reception, the determination result is given as "No", and the procedure proceeds to Step S103. When the standard radio wave receiver 113 performs reception from all the stations, the standard radio wave signal controller 126 gives a determination result as "Yes", and the procedure proceeds to Step S106.

Step S106 is a reception completion step. In this step, the standard radio wave signal controller 126 determines that a standard radio wave cannot be received and completes the reception. Next, the process proceeds to Step S107.

Step S107 is a normal hand operation step. In this step, the hand operation stopped in Step S90 is started again to return to the normal hand operation. Next, the process proceeds to Step S81.

Step S108 is a marker acquisition step. In this step, the time information correction unit 123 acquires a marker indicating a zero-second position in the time code, and performs frame synchronization. For example, in the standard radio wave JJY of Japan, a part at which markers P0 and M are continuous is a starting point of the time code. Therefore, the time information correction unit 123 detects the part at which the markers P0 and M are continuous to establish the frame synchronization. Next, the process proceeds to Step S109.

Step S109 is a time code acquisition step. In this step, the time information correction unit 123 decodes the time code output signal output from the standard radio wave reception IC 116, and acquires a time code. Next, the process proceeds to Step S110.

Step S110 is a step of determining whether a predetermined time period elapses. In this step, the standard radio wave signal controller 126 determines the predetermined time period elapses from the time when reception of the standard radio wave is started in Step S102. The predetermined time period in this step is not particularly limited. However, in the present exemplary embodiment, for example, the time period is set to five minutes. When the predetermined time period does not elapse from the time when the time when reception of the standard radio wave is started, the standard radio wave signal controller 126 gives a determination result as "No", and the procedure proceeds to Step S111. When the predetermined time period elapses from the time when reception of the standard radio wave is started, the standard radio wave signal controller 126 determines that a standard radio wave cannot be received even when the reception processing continues. Further, the standard radio wave signal controller 126 gives a determination result as "Yes", and the procedure proceeds to Step S106. Further, power consumption is suppressed.

Step S111 is a step of determining whether the time information is consistent. In this step, the time information correction unit 123 determines whether the time information is consistent. Specifically, the time information correction unit 123 performs a check on time information with a parity bit. In addition, a check on whether the time indicated in the time information is unrealistic or the like is performed.

When the time information correction unit 123 determines that the time information is not consistent, the time information correction unit 123 gives a determination result as "No", and the procedure proceeds to Step S109. When the time information correction unit 123 determines that the time information is consistent, the time information correction unit 123 gives a determination result as "Yes", and the procedure proceeds to Step S112.

Step S112 is a step of determining whether three pieces of frame data match with one another. In this step, the time information correction unit 123 inputs three successive time codes. Further, when the time information acquired from each time code is at one-minute interval, it is determined that the three pieces of frame data match with one another.

When the time information correction unit 123 determines that the three pieces of frame data does not match with one another, the time information correction unit 123 gives a determination result as "No", and the procedure proceeds to Step S109. When the time information correction unit 123 determines that the three pieces of frame data match with one another, the time information correction unit 123 gives a determination result as "Yes", and the procedure proceeds to Step S113.

Step S113 is a reception completion step. In this step, the standard radio wave signal controller 126 causes the standard radio wave receiver 113 to complete a reception operation of a standard radio wave. Next, the process proceeds to Step S114.

Step S114 is a time correction step. In this step, the time information correction unit 123 corrects the time data calculated by the timekeeping circuit 93 using the time information acquired from the standard radio wave receiver 113.

When the time information correction unit 123 corrects the time data, the display controller 97 corrects displays of the center second hand 18, the center minute hand 21, and the center hour hand 22 via the drive circuit 90 based on the corrected time data. Next, the display controller 97 performs a normal hand operation. As described above, the standard radio wave receiver 113 receives a standard radio wave containing time information. Further, when the standard radio wave is received, the time information correction unit 123 corrects time using the time information.

Step S107 is a normal hand operation step. In this step, the hand operation stopped in Step S90 is moved again to return to the normal hand operation. With the steps described above, Step S91 is completed. Next, the process proceeds to Step S81.

As described above, according to the present exemplary embodiment, the following advantages are achieved.

(1) According to the present exemplary embodiment, in the electronic watch 111, the standard radio wave receiver 113 receives a standard radio wave. Further, the first time correction unit 127 corrects time using the standard radio wave. Therefore, when the standard radio wave can be received, time can be corrected at high accuracy.

Moreover, the beacon receiver 88 receives a beacon signal. When the beacon signal can be received, a time difference can be corrected. When the buttons 14 accept a reception instruction of a beacon signal, the beacon receiver 88 receives a beacon signal. The electronic watch 111 causes the third storage unit 122 to store UUIDs of specific locations and time difference information corresponding to the UUIDs.

When the third storage unit 122 stores UUIDs installed at locations at which the operator 5 is less likely to give a reception instruction and time difference information corresponding to the UUIDs, an enormous storage capacity is required for the third storage unit 122. In the electronic watch 111, the operator 5 gives a reception instruction of a beacon signal, and hence the third storage unit 122 is only required to store the UUIDs installed at the locations at which the operator 5 is highly likely to give a reception instruction and the time difference information corresponding to the UUIDs. Therefore, the electronic watch 111 can correct a time difference even with a limited storage capacity of the third storage unit 122.

(2) According to the present exemplary embodiment, the standard radio wave receiver 113 receives a standard radio wave. The standard radio wave has intensity higher than that of a GPS satellite signal. Therefore, as compared to the case where a satellite signal is received, power consumption in reception of a standard radio wave can be reduced.

(3) In the method of correcting time and a time difference according to the present exemplary embodiment, a standard radio wave containing time information is received. Further, time is corrected using the time information. Therefore, when the standard radio wave can be received, time is corrected at high accuracy.

Moreover, the beacon receiver 88 receives a beacon signal. When the beacon signal can be received, a time difference can be corrected. When the buttons 14 accept a reception instruction of a beacon signal, the beacon receiver 88 receives a beacon signal. The electronic watch 111 causes the third storage unit 122 to store UUIDs of specific locations and time difference information corresponding to the UUIDs.

When the third storage unit 122 stores UUIDs installed at locations at which the operator 5 is less likely to give a reception instruction and time difference information corresponding to the UUIDs, an enormous storage capacity is required for the third storage unit 122. In the electronic watch 111, the operator 5 gives a reception instruction of a beacon signal, and hence the third storage unit 122 is only required to store the UUIDs installed at the locations at which the operator 5 is highly likely to give a reception instruction and the time difference information corresponding to the UUIDs. Therefore, the electronic watch 111 can correct a time difference even with a limited storage capacity of the third storage unit 122.

Third Exemplary Embodiment

Figure 27:
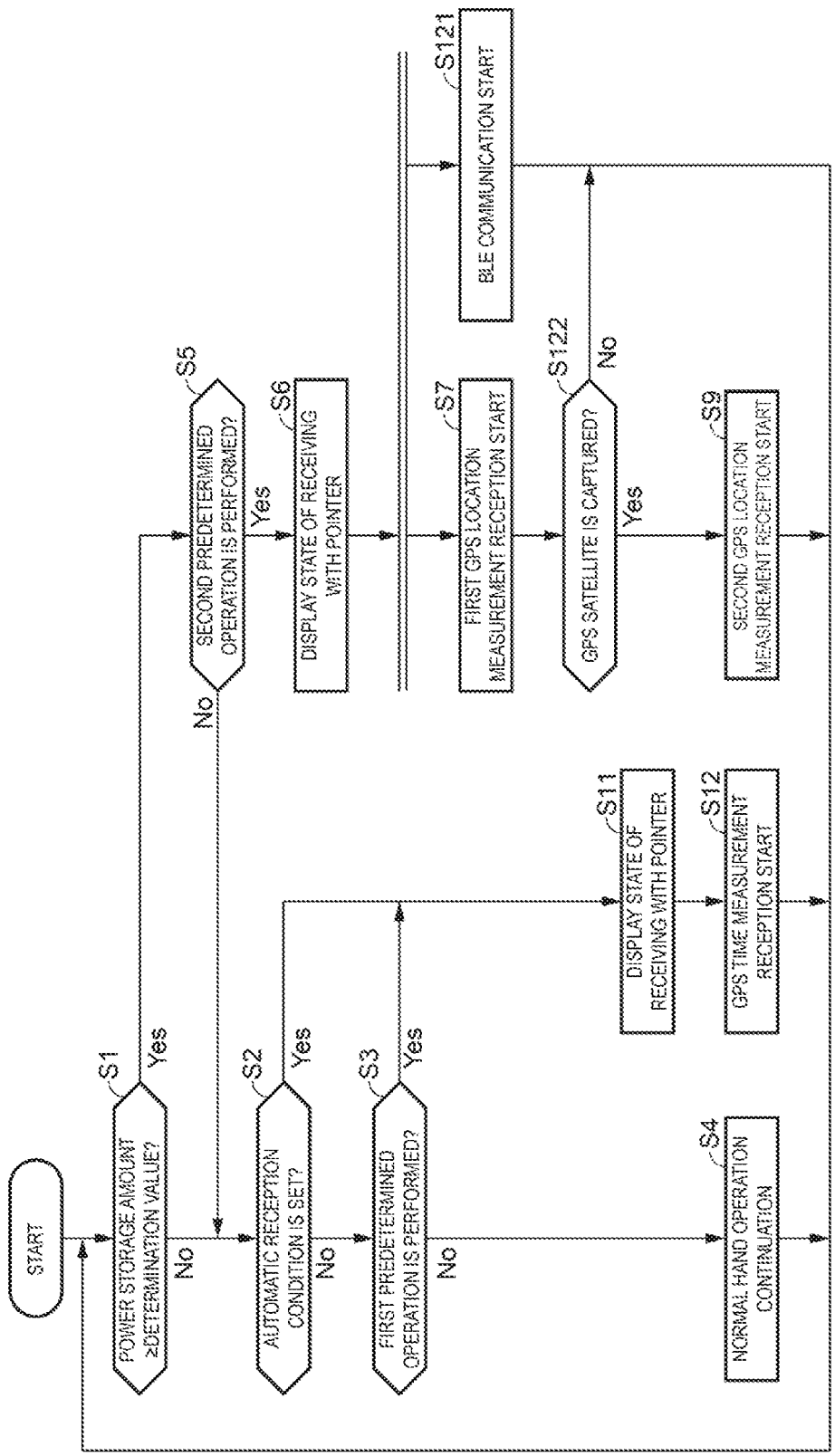
FIG. 27 is a flowchart of a method of correcting time and a time difference according to a third exemplary embodiment.

Next, with reference to a flowchart of a method of correcting time and a time difference in FIG. 27, one exemplary embodiment of an electronic watch is described. The present exemplary embodiment is different from the first exemplary embodiment in that the BLE communication is performed in parallel with the GPS location measurement reception. Note that the matters similar to those in the first exemplary embodiment are omitted in description.

In FIG. 27, Step S1 to Step S6, Step S11, and Step S12 are steps with the same contents as those in the first exemplary embodiment, and hence description thereof is omitted. After Step S6, the first GPS location measurement reception start step in Step S7 and the BLE communication start step in Step S121 are performed in parallel.

The first GPS location measurement start step in Step S7 is the same as that in Step S7 in the first exemplary embodiment. In this step, the location measurement reception controller 107 outputs a control signal to the GPS receiver 83 to start the location measurement reception processing. When start of the location measurement reception processing is instructed, the GPS receiver 83 executes processing of searching satellite signals transmitted from the artificial satellites 3. Next, the process proceeds to Step S122.

The step of determining whether a GPS satellite is captured in Step S122 is the same step as Step S8 in the first exemplary embodiment. In this step, the location measurement reception controller 107 inputs, from the GPS receiver 83, data on signal intensity of the satellite signals. Further, when the signal intensity of the plurality of satellite signals is equal to or more than a determination value, the location measurement reception controller 107 determines that the satellite signals transmitted from the artificial satellites 3 can be captured. Further, the location measurement reception controller 107 determines whether the predetermined number or more of satellite signals required for location measurement can be captured.

When the predetermined number or more of satellite signals required for location measurement can be captured, the location measurement reception controller 107 gives a determination result for capture of the satellite signals as "Yes", and the procedure proceeds to Step S9. When the predetermined number or more of satellite signals required for location measurement cannot be captured, the location measurement reception controller 107 gives a determination result on capture of a satellite signal as "No", and the procedure proceeds to Step S1.

The second GPS measurement reception start step in Step S9 is the same as Step S9 in the first exemplary embodiment. In this step, three or more satellite signals are received, and a location of the electronic watch 1 is measured. Specifically, Step S41 to Step S54 are performed. The GPS receiver 83 receives a plurality of satellite signals containing satellite orbit information. Further, the location measurement reception controller 107 of the first time correction unit 104 calculates a reception location from a plurality of satellite orbit signals. Moreover, the first time correction unit 104 corrects time in accordance with the reception location of the satellite signals. Next, the process proceeds to Step S1.

Step S121 is a BLE communication start step. In this step, the BLE communication is started in parallel with the GPS location measurement reception. Specifically, Step S61 to Step S71 are performed. The beacon receiver 88 receives a beacon signal. Further, the second time correction unit 105 corrects time in accordance with the reception location of the beacon signal. Next, the process proceeds to Step S1.

As described above, Step S7 and Step S121 are performed in parallel. Further, the GPS receiver 83 and the beacon receiver 88 operate in parallel. Further, the GPS receiver 83 receives three or more satellite signals, and the location measurement reception controller 107 specifies a reception location. Moreover, the beacon receiver 88 receives a beacon signal, and the second time correction unit 105 specifies a reception location. Therefore, means that the GPS receiver 83 and the location measurement reception controller 107 specify a reception location and means that the beacon receiver 88 and the second time correction unit 105 specify a reception location are performed in parallel.

The two reception locations specification means differ in receivability or a time period required for reception in accordance with conditions of an artificial satellite and a beacon. As compared to a case where only one of the two means is performed, the two means are performed in parallel to increase possibility of specifying a reception location. Further, as compared to a case where the two means are performed one by one, a reception location can be specified in a shorter time period under a condition in which both the two means can specify a reception location.

Note that, when time is corrected in one of Step S7 and Step S121, and the processing is in progress in the other step, the processing in the other step may be canceled. Power consumption in execution of the processing can be reduced.

In addition, the processing in each of Step S7 and Step S121 may be executed till completion. Further, two patterns of the corrected time calculated in the two steps may be compared, and a difference between the two patterns may be compared with a determination value. Further, when the difference between the two patterns of the corrected time is small, time may be corrected. A malfunction in time correction can be suppressed.

Fourth Exemplary Embodiment

Figure 28:
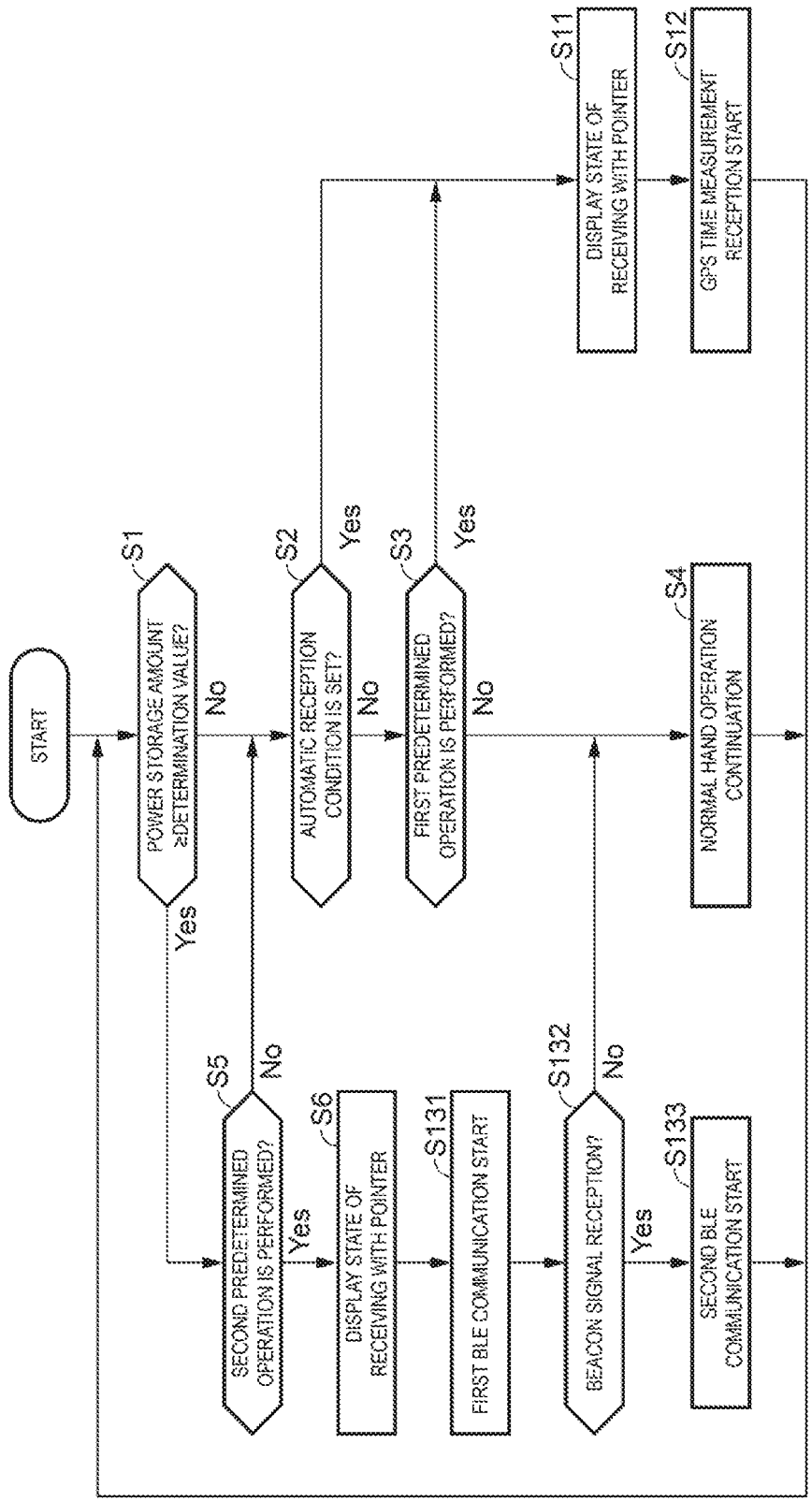
FIG. 28 is a flowchart of a method of correcting time and a time difference according to a fourth exemplary embodiment.

Next, with reference to a flowchart of a method of correcting time and a time difference in FIG. 28, one exemplary embodiment of an electronic watch is described. The present exemplary embodiment is different from the first exemplary embodiment in that the GPS time measurement communication and the BLE communication are performed without performing the GPS location measurement reception. Note that the matters similar to those in the first exemplary embodiment are omitted in description.

In FIG. 28, Step S1 to Step S6, Step S11, and Step S12 are the same steps as those in the first exemplary embodiment, and hence description thereof is omitted. After Step S6, a first BLE communication start step in Step S131 is performed.

Step S131 is the same step as Step S62 in the first exemplary embodiment. In this step, the near field communication controller 102 drives the beacon receiver 88 to scan a beacon signal transmitted from the beacon 4. Also in this case, when the second button 14*b* accepts a reception instruction of a beacon signal containing beacon identification information in Step S5, the beacon receiver 88 receives a beacon signal. Next, the process proceeds to Step S132.

Step S132 is a step of determining whether a beacon signal is received. Step S132 is the same step as Step S63 in the first exemplary embodiment. In this step, the first signal controller 132 determines whether the beacon receiver 88 receives a UUID contained in the beacon signal. When the beacon receiver 88 cannot receive a UUID, the determination result is given as "No", and the procedure proceeds to Step S4. When the beacon receiver 88 receives a UUID, the determination result is given as "Yes", and the procedure proceeds to Step S133.

Step S133 is a second BLE communication start step. In Step S133, the similar steps as Step S65 to Step S71 in the first exemplary embodiment are performed. In this step, the time information correction unit 96 inputs the UUID from the beacon receiver 88. Further, the time information correction unit 96 searches for the time difference information corresponding to the UUID from the first storage unit 92. When the UUID that matches is present in the first storage unit 92, the time information correction unit 96 inputs the time difference information corresponding to the UUID from the first storage unit 92.

Next, the time information correction unit 96 corrects the time data using the time difference information. Next, the display controller 97 corrects displays by fast-forwarding the center second hand 18, the center minute hand 21, and the center hour hand 22 via the drive circuit 90 based on the time data after correction. As described above, when the beacon signal is received, the time information correction unit 96 corrects time based on the UUID contained in the beacon signal using the time difference information stored in the first storage unit 92.

In the present exemplary embodiment, the BLE communication is performed to acquire the time difference information without performing the GPS location measurement reception. In the GPS location measurement reception, a very weak satellite signal is received at a plurality of times, and hence power consumption in the time correction is large. In the BLE communication, the beacon receiver 88 receives a radio wave with high intensity, and hence power consumption in the time correction is small. Therefore, power consumption in the time correction in accordance with a time difference can be reduced.

Note that the present exemplary embodiment is not limited to the above-described exemplary embodiment. It should be understood by those skilled in the art that various modifications and alterations may occur in so far as they are within the spirit and technical scope of the present disclosure. Modifications are described below.

Modification 1

In the first exemplary embodiment, identification information of a building is acquired from the beacon 4. In addition, identification information of a building may be acquired from a WiFi (registered trademark) access point. A WiFi radio wave has a frequency band of 2.4 GHz, and hence is receivable by the back surface protection material of the solar cell panel. A Media Access Control (MAC) address or a Service Set Identifier (SSID) of an access point may be extracted from the second radio wave 2*b* to recognize the access point. Further, the first storage unit 92 stores time difference information corresponding to a MAC address or an SSID of an access point.

When the electronic watch 1 receives a WiFi radio wave, a MAC address or an SSID is extracted from the WiFi radio wave. Further, the time difference information corresponding to the MAC address and the SSID may be input from the first storage unit 92, and the time information correction unit 96 may correct time. In this case, the WiFi access points correspond to the radio stations. The MAC address or the SSID corresponds to the beacon identification information. As a method of detecting a WiFi radio wave, WiFi Aware being a proximity information recognition technique. The MAC address or the SSID can be extracted without connection via a wireless Local Area Network (LAN).

In the first exemplary embodiment, the back surface protection material of the solar cell panel is used as a near field communication antenna for a frequency band of 2.4 GHz such as BLE and WiFi. A chip antenna using a ceramic dielectric base material may be used in place of the back surface protection material of the solar cell panel. The chip antenna is a general-purpose item and accessible. Moreover, a shape and a dimension of the chip antenna is known, an hence a time period for antenna design can be reduced.

Now, contents derived from the Exemplary Embodiments are described.

The electronic watch includes a first receiver configured to receive a satellite signal, a first time correction unit configured to correct the time using time information contained in the satellite signal received by the first receiver, a second receiver configured to receive a beacon signal containing beacon identification information transmitted from a radio station installed indoors, a storage unit configured to store predetermined beacon identification information and time difference information corresponding to the beacon identification information, a second time correction unit configured to correct a time difference using the beacon signal received by the second receiver and the time difference information stored in the storage unit, and an operation device configured to accept a reception instruction of the beacon signal. The second receiver configured to receive the beacon signal when the operation device accepts the reception instruction.

According to this configuration, in the electronic watch, the first receiver receives a satellite signal. Further, using the satellite signals, the first time correction unit corrects time. Therefore, time can be corrected at any locations as long as the locations are outside a building.

Moreover, the second receiver receives a beacon signal. The storage unit stores the beacon identification information and the time difference information corresponding to the beacon identification information. Further, the second time correction unit corrects a time difference using the beacon signal and the time difference information. Therefore, when the beacon signal can be received, a time difference can be corrected.

When the operation device accepts a reception instruction of a beacon signal, the second receiver receives a beacon signal. When arriving at a space indoors such as an airport after a long-distance travel by an airplane or the like, intensity of a radio wave is weak inside the airport, and hence the satellite signal is hard to receive. In this case, an operator gives a reception instruction of a beacon signal, and causes the electronic watch to correct a time difference. Specific locations such as an airport at which the operator performs time correction are known in advance. Therefore, the electronic watch is only required to store, in the storage unit, beacon identification information of specific locations and time difference information corresponding to the beacon identification information.

When the storage unit stores beacon identification information installed at locations at which the operator is less likely to give a reception instruction and the time difference information corresponding to the beacon identification information, an enormous storage capacity is required for the storage unit. In the present electronic watch, the operator gives a reception instruction of a beacon signal, and hence the storage unit is only required to store the beacon identification information installed at the locations at which the operator is highly likely to give a reception instruction and the time difference information corresponding to the beacon identification information. Therefore, the electronic watch can correct a time difference even with a limited storage capacity.

The electronic watch includes a first receiver configured to receive a standard radio wave, a first time correction unit configured to correct the time using time information contained in the standard radio wave received by the first receiver, a second receiver configured to receive a beacon signal containing beacon identification information transmitted from a radio station installed indoors, a storage unit configured to store predetermined beacon identification information and time difference information corresponding to the beacon identification information, a second time correction unit configured to correct a time difference using the beacon signal received by the second receiver and the time difference information stored in the storage unit, and an operation device configured to accept a reception instruction of the beacon signal. The second receiver configured to receive the beacon signal when the operation device accepts the reception instruction.

According to this configuration, in the electronic watch, the first receiver receives a standard radio wave. Further, the first time correction unit corrects time using the standard radio wave. Therefore, when the standard radio wave can be received, time can be corrected at high accuracy. Further, intensity of the standard radio wave is stronger than that of the satellite signal, and hence power consumption in reception can be reduced.

Moreover, the second receiver receives a beacon signal. The storage unit stores the beacon identification information and the time difference information corresponding to the beacon identification information. Further, the second time correction unit corrects a time difference using the beacon signal and the time difference information. Therefore, when the beacon signal can be received, a time difference can be corrected.

When the operation device accepts a reception instruction of a beacon signal, the second receiver receives a beacon signal. When arriving at a space indoors such as an airport after a long-distance travel by an airplane or the like, intensity of a radio wave is weak inside the airport, and hence the satellite signal is hard to receive. In this case, an operator gives a reception instruction of a beacon signal, and causes the electronic watch to correct a time difference. Specific locations such as an airport at which the operator performs time correction are known in advance. Therefore, the electronic watch is only required to store, in the storage unit, beacon identification information of specific locations and time difference information corresponding to the beacon identification information.

When the storage unit stores beacon identification information installed at locations at which the operator is less likely to give a reception instruction and the time difference information corresponding to the beacon identification information, an enormous storage capacity is required for the storage unit. In the present electronic watch, the operator gives a reception instruction of a beacon signal, and hence the storage unit is only required to store the beacon identification information installed at the locations at which the operator is highly likely to give a reception instruction and the time difference information corresponding to the beacon identification information. Therefore, the electronic watch can correct a time difference even with a limited storage capacity.

In the electronic watch described above, the first receiver may be configured to receive a plurality of satellite signals each of which contains satellite orbit information, the first time correction unit may include a location calculation unit configured to calculate a reception location from a plurality of pieces of satellite orbit information. When the first receiver fails to receive the plurality of satellite signals, the first receiver may stop, and the second receiver may receive the beacon signal.

According to this configuration, the first receiver receives a plurality of satellite signals. Further, when the first receiver can receive a plurality of satellite signals, the location calculation unit calculates a reception location. When the first receiver fails to receive a plurality of satellite signals, the first receiver stops. Next, the second receiver receives a beacon signal. Further, the second time correction unit corrects time. As described above, the first receiver and the second receiver are not operated in parallel, and hence a peak of power consumption can be lowered.

In the electronic watch described above, the first receiver may be configured to receive a plurality of satellite signals each of which contains satellite orbit information, the first time correction unit may include a location calculation unit configured to calculate a reception location from a plurality of pieces of satellite orbit information, and the first receiver and the second receiver may be operated in parallel.

According to this configuration, the first receiver and the second receiver operate in parallel. Further, the first receiver receives four satellite signals, and the location calculation unit specifies a reception location. Moreover, the second receiver receives a beacon signal, and the second time correction unit specifies a beacon installation location. The beacon installation location is at the substantially same location as a location at which the second receiver receives the beacon signal. Therefore, processing of specifying a reception location by the first receiver and the location calculation unit and processing of specifying a reception location by the second receiver and the second time correction unit are executed in parallel. The two reception locations specification means differ in receivability or a time period required for reception in accordance with conditions of an artificial satellite and a beacon. As compared to a case where only one of the two means is performed, the two means are performed in parallel to increase possibility of specifying a reception location. Further, as compared to a case where the two means are performed one by one, a reception location can be specified in a shorter time period under a condition in which both the two means can specify a reception location.

In the electronic watch described above, the storage unit may include a re-writable nonvolatile memory.

According to this configuration, the storage unit includes a re-writable nonvolatile memory. The nonvolatile memory can maintain storage without power consumption. Further, the storage unit is re-writable, and hence identification information of a beacon to be used can be changed.

The method of correcting a time difference, which is performed by an electronic watch including a storage unit configured to store beacon identification information and time difference information corresponding to the beacon identification information, and an operation device, includes receiving a satellite signal containing time information, correcting time using the time information when the satellite signal is received, receiving a beacon signal when the operation device accepts a reception instruction of the beacon signal containing beacon identification information, and correcting a time difference using the time difference information stored in the storage unit based on the beacon identification information contained in the beacon signal when the beacon signal is received.

According to this configuration, during the time correction, the first receiver receives a satellite signal containing time information. Further, time is corrected using the time information. Therefore, when the satellite signals can be received, time is corrected at high accuracy.

Moreover, when the operator performs an operation of giving a reception instruction of a beacon signal, the operation device accepts a reception instruction. Further, the second receiver receives a beacon signal. The storage unit stores the beacon identification information and the time difference information corresponding to the beacon identification information. Further, the controller corrects time using the beacon signal and the time difference information. Therefore, when the beacon signal can be received, a time difference can be corrected.

When arriving at a space indoors such as an airport after a long-distance travel by an airplane or the like, intensity of a radio wave is weak inside the airport, and hence the satellite signal or the standard radio wave is hard to receive. In this case, an operator gives a reception instruction of a beacon signal, and causes the electronic watch to correct time. Specific locations such as an airport at which the operator performs time correction are known in advance. Therefore, the storage unit is only required to store the beacon identification information of the specific locations and the time difference information corresponding to the beacon identification information.

When the storage unit stores the beacon identification information installed at the locations at which the operator is less likely to give a reception instruction and the time difference information corresponding to the beacon identification information, an enormous storage capacity is required for the storage unit. In the present electronic watch, the operator gives a reception instruction of a beacon signal, and hence the storage unit is only required to store the beacon identification information installed at the locations at which the operator is highly likely to give a reception instruction and the time difference information corresponding to the beacon identification information. Therefore, the electronic watch can correct a time difference even with a limited storage capacity.

A method of correcting a time difference, which is performed by an electronic watch including a storage unit configured to store beacon identification information and time difference information corresponding to the beacon identification information, and an operation device, includes receiving a standard radio wave containing time information, correcting time using the time information when the standard radio wave is received, receiving a beacon signal when the operation device accepts a reception instruction of the beacon signal containing beacon identification information, and correcting a time difference using the time difference information stored in the storage unit based on the beacon identification information contained in the beacon signal when the beacon signal is received.

According to this configuration, during the time correction, the first receiver receives a standard radio wave containing time information. Further, time is corrected using the time information. Therefore, when the standard radio wave can be received, time is corrected at high accuracy.

Moreover, when the operator performs an operation of giving a reception instruction of a beacon signal, the operation device accepts a reception instruction. Further, the second receiver receives a beacon signal. The storage unit stores the beacon identification information and the time difference information corresponding to the beacon identification information. Further, the controller corrects time using the beacon signal and the time difference information. Therefore, when the beacon signal can be received, a time difference can be corrected.

When arriving at a space indoors such as an airport after a long-distance travel by an airplane or the like, intensity of a radio wave is weak inside the airport, and hence the satellite signal or the standard radio wave is hard to receive. In this case, an operator gives a reception instruction of a beacon signal, and causes the electronic watch to correct time. Specific locations such as an airport at which the operator performs time correction are known in advance. Therefore, the storage unit is only required to store the beacon identification information of the specific locations and the time difference information corresponding to the beacon identification information.

When the storage unit stores the beacon identification information installed at the locations at which the operator is less likely to give a reception instruction and the time difference information corresponding to the beacon identification information, an enormous storage capacity is required for the storage unit. In the present electronic watch, the operator gives a reception instruction of a beacon signal, and hence the storage unit is only required to store the beacon identification information installed at the locations at which the operator is highly likely to give a reception instruction and the time difference information corresponding to the beacon identification information. Therefore, the electronic watch can correct a time difference even with a limited storage capacity.

What is claimed is:

1. An electronic watch comprising:
a timekeeping circuit configured to keep time;
a first receiver configured to receive a satellite signal containing time information;
a first time correction unit configured to correct the time using the time information contained in the satellite signal received by the first receiver;
a beacon communication circuit comprising a second receiver, separate from the first receiver, configured to receive a beacon signal containing beacon identification information transmitted from a ground-based radio station;
a storage unit configured to store a plurality of pieces of beacon identification information as received in the beacon signal by the second receiver and a plurality of pieces of time difference information corresponding to the plurality of pieces of beacon identification information;
a second time correction unit configured to correct the time using the time difference information corresponding to the beacon identification information of the beacon signal received by the second receiver among the plurality of pieces of time difference information stored in the storage unit; and
an operation device configured to accept a reception instruction of the beacon signal, wherein
the second receiver is configured to receive the beacon signal when the operation device accepts the reception instruction.

2. The electronic watch according to claim 1, wherein
the first receiver is configured to receive a plurality of the satellite signals containing satellite orbit information,
the first time correction unit includes a location calculation unit configured to calculate a reception location from a plurality of pieces of the satellite orbit information, and
when the first receiver fails to receive the plurality of satellite signals, the first receiver stops, and the second receiver receives the beacon signal.

3. The electronic watch according to claim 1, wherein
the first receiver is configured to receive a plurality of the satellite signals containing satellite orbit information,
the first time correction unit includes a location calculation unit configured to calculate a reception location from a plurality of pieces of the satellite orbit information, and
the first receiver and the second receiver operate in parallel.

4. The electronic watch according to claim 1, wherein
the storage unit includes a re-writable nonvolatile memory.

5. An electronic watch comprising:
a timekeeping circuit configured to keep time;
a first receiver configured to receive a standard radio wave containing time information;
a first time correction unit configured to correct the time using the time information contained in the standard radio wave received by the first receiver;
a beacon communication circuit comprising a second receiver, separate from the first receiver, configured to receive a beacon signal containing beacon identification information transmitted from a ground-based radio station;
a storage unit configured to store a plurality of pieces of the beacon identification information as received in the beacon signal by the second receiver and a plurality of pieces of time difference information corresponding to the plurality of pieces of beacon identification information;
a second time correction unit configured to correct the time using the time difference information corresponding to the beacon identification information of the beacon signal received by the second receiver among the plurality of pieces of time difference information stored in the storage unit; and
an operation device configured to accept a reception instruction of the beacon signal, wherein
the second receiver is configured to receive the beacon signal when the operation device accepts the reception instruction.

6. The electronic watch according to claim 5, wherein
the storage unit includes a re-writable nonvolatile memory.

7. A method of correcting a time difference, performed by an electronic watch including a timekeeping circuit configured to keep time, a storage unit configured to store a plurality of pieces of beacon identification information as received in a beacon signal and a plurality of pieces of time difference information corresponding to the plurality of pieces of beacon identification information, and an operation device, the method comprising:
receiving, using a first receiver, a satellite signal containing time information;

correcting the time using the time information when the satellite signal is received;

receiving, from a ground-based radio station using a beacon communication circuit comprising a second receiver separate from the first receiver, the beacon signal when the operation device accepts a reception instruction of the beacon signal containing the beacon identification information; and correcting the time using the time difference information corresponding to the beacon identification information of the beacon signal among the plurality of pieces of time difference information stored in the storage unit when the beacon signal is received.

* * * * *